United States Patent [19]
Sakaguchi

[11] Patent Number: 5,995,201
[45] Date of Patent: Nov. 30, 1999

[54] DIGITAL PRINT METHOD

[75] Inventor: Yasunobu Sakaguchi, Kanagawa, Japan

[73] Assignee: Fuji Photo Film Co., Ltd., Kanagawa, Japan

[21] Appl. No.: 09/006,399

[22] Filed: Jan. 13, 1998

[30] Foreign Application Priority Data

Jan. 13, 1997 [JP] Japan ..................................... 9-003843

[51] Int. Cl.⁶ ........................... G03B 27/52; G03B 27/34; G03B 15/00
[52] U.S. Cl. ................................. 355/55; 355/40; 355/56; 399/45
[58] Field of Search ................................... 355/55, 30, 35, 355/38, 41, 56, 27, 40; 250/578.1; 358/296, 302, 293; 399/45, 48; 382/319

[56] References Cited

FOREIGN PATENT DOCUMENTS 6-217091  8/1994  Japan .
6-233052  8/1994  Japan .
6-245062  9/1994  Japan .

Primary Examiner—Safet Metjahic
Assistant Examiner—Peter B. Kim

[57] ABSTRACT

When no trimming is executed, the optical magnification is fixed and the electronic magnification is changed each time a print size changes in a film original having the same film size, even if recorded images have a different size. Further, the fixed optical magnification is the standard or set optical magnification, which permits the image of the film original to be projected to the effective image region of the image sensor in the state that it inscribes or nearly inscribes the effective pixel region to the greatest possible degree. As a result, a high quality print can be obtained without the deterioration of image quality in high productivity, and without the need of effecting the troublesome optical magnification by operating the zoom lens. Further, when trimming is executed, since preference is given to the optical magnification over the electronic magnification, even if only a part of the image recorded on a film original is enlarged, the deterioration of image quality can be prevented or minimized. In addition, since a trimming region can be adjusted while confirming it through the monitor, a trimming job can be easily executed and trimming accuracy can be improved.

14 Claims, 9 Drawing Sheets

DIGITAL PRINT METHOD

BACKGROUND OF THE INVENTION

The present invention relates to a digital print method of obtaining prints of desired sizes regardless of the presence or absence of trimming by photoelectrically reading images of various sizes recorded on various types and sizes of film originals, subjecting the images to digital signal processing, trimming the images if necessary, and exposing a light-sensitive material using a light source such as a laser beam or the like.

Images recorded on photographic film originals (hereinafter, referred to as film originals or simply as films) such as negative films, reversal films and the like are conventionally printed onto light-sensitive materials such as photographic papers and the like by so-called direct exposure, that is, a method in which an image recorded on a film original is projected onto the light-sensitive material for area exposure.

In contrast, there have been recently proposed digital photoprint systems which make use of digital exposure. The apparatus photoelectrically reads image information recorded on a film, converts the thus read image into a digital signal and thereafter applies various steps of image processing to the digital signal to thereby provide recording digital image information. If these records the image (latent image) on a light-sensitive material by scan exposing it with recording light which is modulated in accordance with the image information, and produces a print through development. Digital photoprinters for embodying the above digital photoprint systems are under development.

The digital photoprint system can freely perform editing and layout jobs for print images such as composition of a plurality of images to a composite image, division of a single image into segments, editing of characters and images and the like and various types of image processing such as color/density adjustments, magnification adjustments, edge enhancement and the like and output finished prints which are freely subjected to editing and image processing in accordance with a specific use. Although conventional print systems employing the direct exposure cannot reproduce all the image density information recorded on a film and the like in such aspects as density resolution, space resolution, color/density reproducibility and the like, the digital photoprinter can output a print in which the image density information recorded on the film is almost perfectly reproduced.

Further, since the digital photoprint system can record (store) the image information of the images recorded on respective films and image processing conditions to the image information to a memory device provided with the system and an external memory device such as a floppy disc and the like, there is an advantage that extra printing and other jobs can be accomplished without any films that serve as originals. What is more, extra printing and other jobs can be performed in a rapid and efficient manner because processing conditions need not be set again.

Essentially, the digital photoprint system and the digital photoprinter under consideration are composed of an image input device for photoelectrically reading the image recorded on an original such as a film or the like through an image sensor or the like, a display device for displaying the thus read image, an image processing device for effecting image processing operations on the thus read image and determining exposing conditions for recording the image and an image recording device for obtaining a print to be subjected to a development process by scan exposing a light-sensitive material in accordance with the determined exposing conditions. The applicant invented various devices and methods for realizing such a digital photoprint system and proposed them in Japanese Unexamined Patent Publication Nos. 6-217091, 6-233052 and 6-245062, together with the disclosure of an outline of the digital photoprinter.

Incidentally, in the digital photoprint systems and digital photoprinters described above and proposed until now, an original image read by an image sensor is displayed on a display such as a monitor or the like. However, since there are various processes from the time the image born by a film original is read by the image sensor to the time the image is finally made to a print by being exposed and developed, the image region displayed on the screen of the monitor does not always match the reproduced image region in the print. Such mismatch also arises likewise when trimming is effected. Further, conventional digital photoprint systems have a problem that even if they can display a finished print region on a monitor, since they do not sufficiently take an image deficit that is, so-called "vignetting" caused in various processes into consideration, it cannot be said that the finishing region displayed on the monitor perfectly matches a print image region.

In addition to the problem of the mismatch, there are also problems that the periphery of an image born by the film original lies off the effective pixel region of an image sensor and a necessary peripheral portion of the image is lacking from a print. Further, since a projected image is smaller than the effective pixel region of the image sensor, an image signal having a sufficient number of input pixels cannot be obtained and a number of output pixels is increased by great enlargement effected by image processing. Thus, the image reproduced on a print is liable to appear out-of-focus and the degree of fineness of the quality of the print is deteriorated depending upon a method of projecting the film original to the image sensor. That is, depending upon, for example, how an optical magnification (optical enlargement/reduction) is set to determine a size of the projected image. This is because that film originals include various types and sizes such as, for example, the negative film, the reversal film and the like, a 135 size, a 240 size and the like, and even a film of the same size includes recorded images having various sizes such as, for example, a full size (F), a high-vision size (H), a panorama size (P) and the like. There arises another problem that if an optical magnification is fixed when an image born by the film original is trimmed, since the image is enlarged by image processing, there is a noticeable tendency that the image reproduced on a print is made to an out-of-focus state and the quality of the image is deteriorated. There is still another problem that the aforesaid various problems are more easily caused and difficult to be adjusted when images recorded on the same film original include a plurality of sizes in addition to that the film original to be handled has various types and sizes and when a digital photoprint system can arbitrarily set a plurality of finished print sizes regardless of the type and size of the film original and the size of a recorded image. Further, when the optical magnification is changed in accordance with the size of an image to be read in the above digital photoprint system to properly read the image born by the film original as much as possible, a further problem arises in that since images having different recorded sizes exist even in the film of the same size, the optical magnification and a focus must be adjusted each time the size of the recorded image to be processed changes even in the same film and productivity cannot be increased.

SUMMARY OF THE INVENTION

An object of the present invention is to provide a digital print method capable of making a plurality of sizes of prints from a plurality of images of different sizes born by film originals having a plurality of different film sizes and reading by an image sensor any size of the images born by the film originals of any film size and the images in the trimmed regions of the film originals as much as possible when the images are trimmed, causing no deterioration of image quality to prints of any arbitrary size, capable of obtaining fine image quality through image processing effected using a minimum possible electronic magnification, having high reproducing accuracy of the film originals to the prints and further having high productivity by solving the above problems.

Another object of the present invention is to provide a digital print method capable of easily matching a trimmed image with the region within an image turning device 82, negative/positive conversion device 84 and the like, easily confirming the matching state and easily and correctly performing a trimming job by displaying, together with an image read by an image sensor, a reference line in accordance with a print size on a monitor in order to show a finishing region in consideration of a pixel deficit caused by image processing and magnifying (enlarging/reducing) at least one of the read image and the displayed line.

To achieve the above objects, a digital print method of the present invention of projecting images having a plurality of image sizes and born by film originals having a plurality of film sizes through a zoom lens, photoelectrically reading the images by an image sensor, subjecting the thus read images to digital image processing, exposing a light-sensitive material based on a thus obtained digital image signal and subjecting the light-sensitive material to development processing so as to be able to obtain prints having reproduced images of a plurality of print sizes comprises the steps of displaying, when a print magnification is changed to output an image of a desired size to be read among the images born by one of the film originals as a print having a reproduced image of a desired print size, a reference line on a monitor together with the image born by the film original and read by the effective pixel region of the image sensor by changing at least one of an optical magnification and an electronic magnification, wherein the optical magnification projects the image of the desired size to be read of the film original into the effective pixel region of the image sensor, the electronic magnification is determined from an output pixel region determined from a desired print size in which the reproduced image is printed and an input pixel region determined from the effective pixel region of the image sensor in consideration of an image deficit caused by the digital image processing, and the reference line shows a cut-out pixel region which will be cut out from the effective pixel region based on the output pixel region and the electronic magnification in consideration of the image deficit as the finishing region of the print corresponding to the print size; setting, when no trimming is executed, the print magnification to a desired value by fixing the optical magnification to a value preset in accordance with the film size of the film original and changing the electronic magnification in accordance with the size of the image born by the film original; and setting, when trimming is executed, the print magnification to a desired value by switching between a case that the image of the desired size to be read is matched with the trimming region within the reference line by magnifying the image displayed on the monitor by giving preference to the change of the optical magnification executed by the operation of the zoom lens over the magnification of the region within the reference line executed by the change of the electronic magnification and a case that the trimming region is matched with the image of the desired size to be read by magnifying the region within the reference line displayed on the monitor by changing the electronic magnification rather than magnifying the image displayed on the monitor by changing the optical magnification while visually observing the image displayed on the monitor and the trimming region shown by the reference line showing the finishing region displayed thereon.

It is preferable that the print magnification is changed by changing the reading pixel density of the image born by the film original and read by the image sensor in accordance with the area or the length of the reproduced image of the print or the electronic magnification set at the time of the trimming.

It is preferable that when the trimming is executed, the print magnification is changed by giving preference to the optical magnification in a low print magnification in which the optical magnification can be changed by the operation of the zoom lens, whereas the print magnification is changed by fixing the optical magnification and changing the electronic magnification in the range in which the optical magnification cannot be changed by the operation of the zoom lens.

Further, it is preferable that when the trimming is executed, the print magnification is changed by the optical magnification or the electronic magnification depending upon the electronic magnification having been set.

DETAILED DESCRIPTION OF THE INVENTION

A digital print method according to the present invention will be described below in detail based on a preferable embodiment shown in the accompanying drawings.

Figure 1:
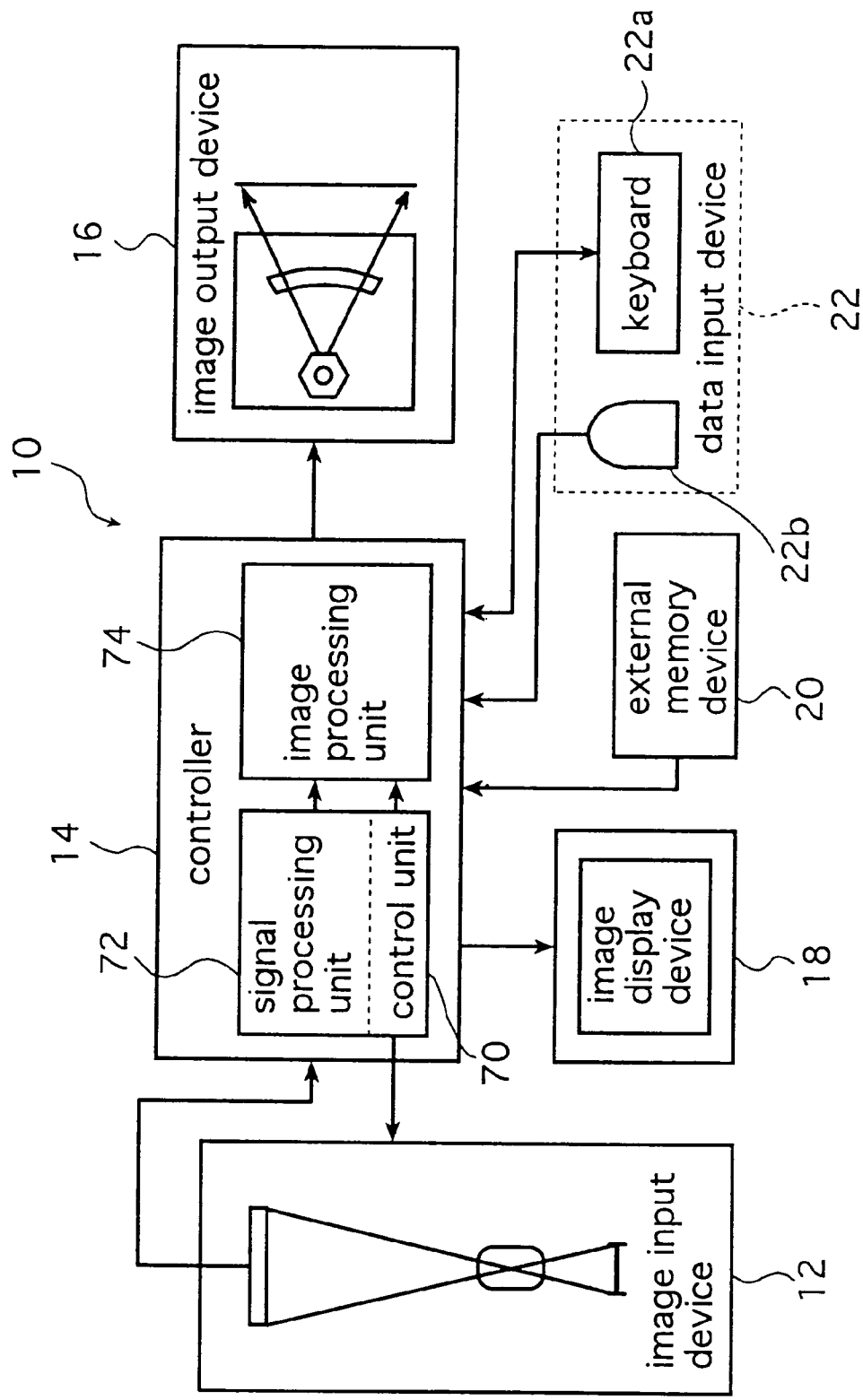
FIG. 1 is a block diagram of an embodiment of a digital print apparatus of the present invention for embodying a digital print method according to the present invention.

FIG. 1 is a schematic block diagram showing an embodiment of a digital print apparatus for embodying a digital print method according to the present invention.

The digital print apparatus 10 shown in FIG. 1 includes an image input device 12 for photoelectrically reading the images having different image sizes which are born by film originals having different film sizes; a controller 14 for setting reading conditions for the image input device 12 and controlling the image input device 12 based on the reading conditions, and, in particular, setting, altering and adjusting an image sensor conversing magnification by changing an optical magnification, an electronic magnification and a reading pixel density in the present invention as well as determining a reading pixel region and a cut-out pixel region, subjecting a read image signal to image processing, automatically setting image processing conditions (auto-set-up) and the like; an image output device 16 for exposing an image to a light-sensitive material based on the image signal processed by the controller 14 and subjecting the light-sensitive material to development processing to thereby output a print on which the reproduced image is born; an image display device (monitor) 18 for displaying an original image read by the image input device 12 as well as the region of the image to be reproduced in accordance with the size of a print output by the image output device 16 and a trimming region; an external memory device 20 composed of a magnetic recording medium such as a server, a hard disc and the like, a magnetic optical recording medium or a magnetic tape and a floppy disc and the driver thereof, the magnetic recording medium storing the image signal of the original image read by the image input device 12, the image signal processed by the controller 14 or used by the image output device 16 and further the image processing conditions, exposing conditions, light-sensitive material processing conditions and the like; and a data input device 22 such as a keyboard 22a, a mouse 22b and the like for setting various conditions such as an optical magnification, a print magnification, an image sensor converting magnification and the like, selecting various steps of processing and inputting information such as correction and the like.

Figure 2:
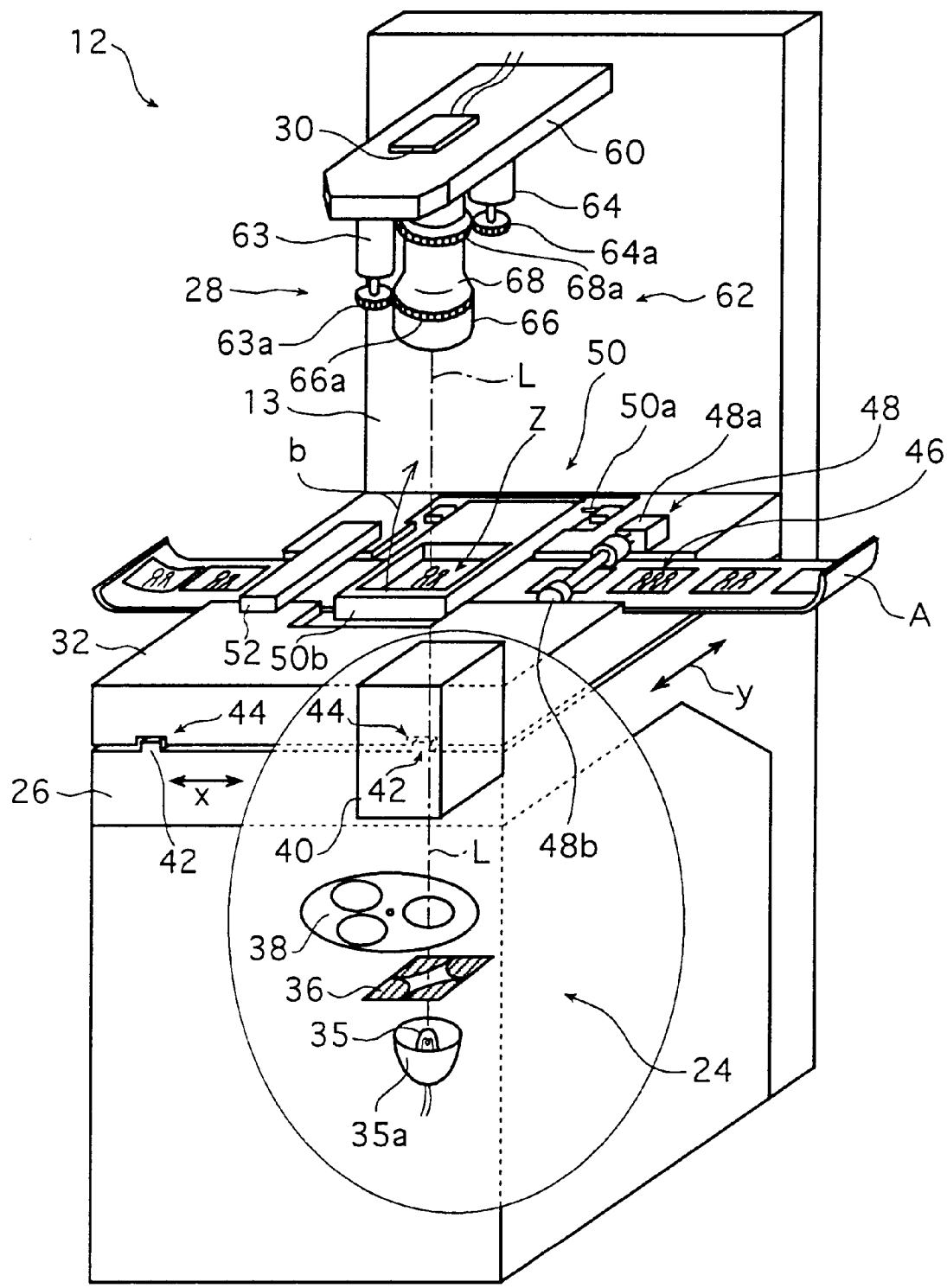
FIG. 2 is a schematic perspective view of an embodiment of an image input device of the digital print apparatus shown in FIG. 1.

The image input device 12 (hereinafter, referred to as an input device) shown in FIG. 2 is a device for photoelectrically reading images recorded on films as film originals which are different in type and size such as a strip as an elongated negative or reversal film on which a lot of images are recorded, a slide ordinarily composed of a single reversal film fixed to a frame (mount) and the like. The image input device 12 is essentially composed of an optical frame 13, a light source section 24, a carrier base 26, an imaging unit 28 to which a zoom lens is assembled, an image sensor 30 as an area sensor, and a carrier such as a film carrier 32, a slide carrier 34 (refer to FIG. 3), a trimming carrier 160 (refer to FIG. 4–FIG. 6) and the like which are mounted on the carrier base 26 so as to be replaced each other.

In the image input device 12, a strip A or a slide B is fed in an x direction in the figure by the film carrier 32 or the slide carrier 34 mounted on the carrier base 26 and stopped at a reading position Z, light from the light source section 24 is irradiated to the image on the film original, projection light bearing the image recorded on the film original is obtained, the projection light is projected onto the image sensor 30 at the imaging unit 28, an image signal is obtained by subjecting the image to photoelectrical conversion and the image recorded on the film original is two-dimensionally read as the image signal. The image input device 12 is controlled by the input control unit 70 of the controller 14 which will be described later (refer to FIG. 4 and FIG. 5).

The light source section 24 is used to produce light having respective colors for irradiating the film original (strip A and slide B), the light being uniformly dispersed and having a sufficient quantity of light to permit the image sensor 30 to decompose the image of the film original to the three primary colors R, G, B and read the image with a pinpoint accuracy. In the image input device 12 of the illustrated example, the light source section 24 which irradiates the strip A from downward of it to obtain the projection light is positioned below the carrier base 26 of the optical frame 13 and includes a light source 35, a reflector 35a, a stop 36, a color filter plate 38 and a diffusion box 40. Further, the light source section 24 is further provided with a cooling fan for cooling the various components such as the light source 35 and the like in addition to the above components and further may be provided with a shutter for shading the light emerging from the light source 35, if necessary.

Various known light sources such as a halogen lamp, a xenon lamp, a mercury vapor lamp and the like which can emit reading light having a quantity which is sufficient for the image sensor 30 to read an image, may be utilized as the light source 35.

The stop 36 is used to regulate the quantity of light from the light source 35 and the illustrated example uses two ND filters each having a logarithm-curved shielding portion and a different quantity of light passing at respective positions in a direction perpendicular to an optical axis L. A quantity of light to a film is regulated by causing the ND filters to come closer to or depart from each other in the direction perpendicular to the optical axis L.

The color filter plate 38 includes three color filters, namely, an R (red) filter, a G (green) filer and a B (blue) filter. When an image is read, the center axis of the color filter plate 38 is turned by not shown rotation means to thereby switch the color of a filter acting on the optical axis L and the R filter, the G filter and the B filter are sequentially inserted into the light passage L to thereby read the image recorded on the film original by decomposing it to the three primary colors of R, G, B.

The diffusion box 40 is used to diffuse the reading light which was emitted from the light source 35 and passed through the color filter with the quantity of light regulated by the stop 36 so that the quantity and other features of the reading light incident on the film is made uniform on a plane perpendicular to the optical axis L. In the illustrated example, the diffusion box 40 is composed of a quadrangular prism having internal specular surfaces and diffusion plates disposed on the upper and lower surfaces of the prism. However, various types of other known diffusion means other than the above may be used.

The carrier base 26 is disposed above the light source section 24 and provides a site on the upper surface thereof where the film carrier 32, or the slide carrier 34, a trimming carrier 160 and the like which will be described later are held at a specific position. The carrier base 26 is secured perpendicular to the optical frame 13. The carrier base 26 has an opening (not shown) formed in an area corresponding to the optical axis L to permit the light emitted from the light source section 24 to pass therethrough. The opening is formed in accordance with the maximum image surface size of the film original which can be read by the light from the light source section 24 through the image sensor 30 in the image input device 12 so that the entire area of the maximum image surface can be sufficiently irradiated.

The carrier base 26 has guide rails 42, 42 formed on the upper surface thereof in a direction away from the operator toward the optical frame 13, namely, in the direction of arrow y which is perpendicular to the direction of arrow x serving as a film feed direction. Grooves 44, 44 which are engaged with the guide rails 42, 42 are formed on the bottom surfaces of the film carrier 32, the slide carrier 34 and the trimming carrier 160. The position of each of the film carrier 32, the slide carrier 34 and the trimming carrier 160 is regulated in the directions of arrow x and arrow y in such a manner that they are pushed in the direction of arrow y until their inner side ends are abutted against the optical frame 13 and fixed there with the grooves 44, 44 thereof engaged with the guide rails 42, 42 of the carrier base 26. As a result, they are positioned at specific position on the carrier base 26 and fixed by a not shown lock mechanism.

These carriers 32, 34 can be removed from the carrier base 26 and very easily replaced with each other by being pulled toward the operator side so that the grooves 44, 44 thereof are drawn out from the guide rails 42, 42. Note, as a means for mounting the film carrier 32, the slide carrier 34, the trimming carrier 160 and the like at the specific position on the carrier base 26 is not particularly limited.

The film carrier 32 feeds the elongated negative film or reversal film on which a lot of images are recorded, that is, the so-called strip (sleeve) A in the lengthwise direction thereof such that the respective image recorded on the strip A are sequentially fed to a specific position on the optical axis L, namely, the reading position Z corresponding to the not shown opening of the carrier base 26 for subsequent reading. The upper surface of the film carrier 32 is provided with a guide groove 46 in an area intersecting the optical axis L in the film feed direction shown by arrow x from a side of the film carrier 32 to the other side thereof. The guide groove 46 has substantially the same width as the strip A, which is fitted into guide groove 46 and fed with its lengthwise direction in agreement with the x-direction such that the respective images are sequentially fed to the reading position Z on the optical axis L. To this end, depth of the guide groove 46 is set such that the image plane (that is, the emulsion plane) of the strip A is at a specific position along the optical axis L (in the direction of focal depth).

An opening (not shown) is formed at the reading position Z of the film carrier 32 to permit the light from the light source section 24 to pass therethrough. This opening serves as a mask for determining the size of the image on the film original which is read by the image sensor 30 in the image input device 12. The shape and size of the opening, that is, the size of the opening region of the mask is set to barely inscribe the size of the image plane so that the vignetting of an image is minimized in accordance with the image surface size of, for example, a 135 size strip A. The opening at the reading position Z of the film carrier 32 occupies a specific position which is different from that of the opening of the aforesaid carrier base 26 on the same optical axis L and it is needless to say that the light emitted from the light source section 24 and passed through the opening of the carrier base 26 can sufficiently irradiate the entire opening of the film carrier 32 even if the film original loaded thereon has any image surface size. Therefore, the light emitted from the light source section 24 and regulated by the mask can sufficiently irradiate the entire image surface size of the original image which can be read by the image input device 12. Note, the opening formed in the film carrier 32 may be set to a size corresponding to the opening of the carrier base 26 and a mask may be replaced so as to correspond to various sizes and mounted on the film carrier 32.

The guide groove 46 is fitted with feed device 48 for feeding the strip A, a film compressing unit 50 and an image plane detecting sensor 52 which are arranged in that order from an upstream side to a downstream side in the x-direction.

The feed device 48 is composed of a motor 48a and feed rollers 48b and intermittently feeds the strip A in the x-direction. When the result of detection with the image plane detecting sensor 52 for detecting a recorded image and the DX code shows that an image of the strip A has come to the reading position Z, the feed device 48 stops feeding the strip A, and upon receiving a READ END signal from the controller 14, the feed device 48 resumes the feed of the strip A until a subsequent image is fed to the reading position Z.

The film compressing unit 50 compresses the strip A disposed at the reading position Z against the guide groove 46 when the image is read by turning a compressing member 50b, to which an opening is formed to permit the projection light of the strip A to pass therethrough, about a rotating shaft 50a in the direction opposite to arrow b so that the curls and other habits of the strip A are eliminated. This insures that the entire image surface is held at a specific position along the optical axis L, that is, at the position where the original is disposed.

Note, the feed of the strip A executed by the film carrier 32 and the operation of the film compressing unit 50 are not limited to the aforesaid arrangement in which they are automatically controlled by the use of the image plane detecting sensor 52 and the like. For example, they may be semi-automatically controlled or the operator may manually turn the compressing member 50b and/or stop and drive the feed device 48.

Figure 3:
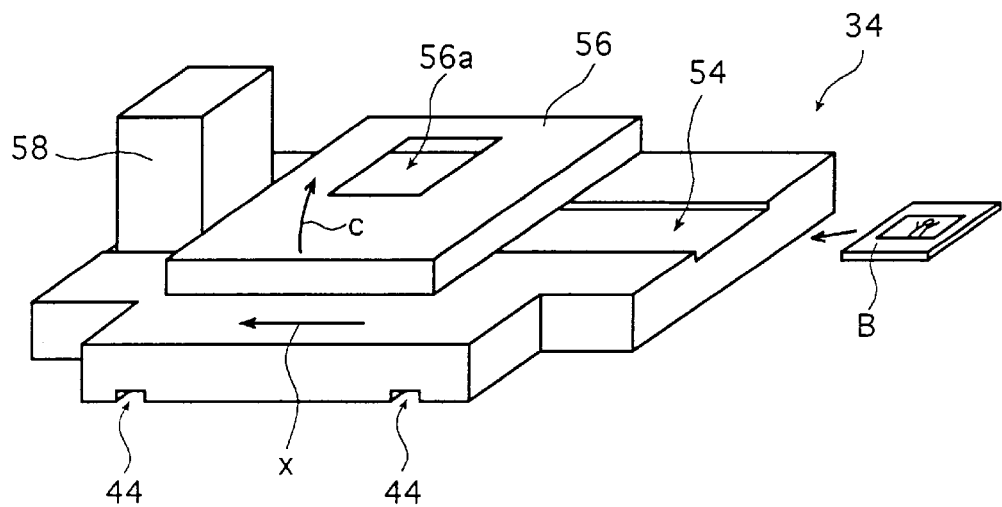
FIG. 3 is a schematic perspective view of an embodiment of a slide carrier used by the image input device shown in FIG. 2.

The slide carrier 34 shown in FIG. 3 is mounted on the carrier base 26 in place of the film carrier 32 shown in FIG. 2. The slide carrier 34 feeds the so-called slide B which is composed of a film having an image recorded thereon and held by a frame in the direction of arrow x, stops it at the reading position Z for subsequent reading and collects the slide B whose image having been read.

The upper surface of the slide carrier 34 is provided with a guide groove 54 for guiding the slide B in an area intersecting the optical axis L in the slide B feed direction shown by arrow x from a side of the slide carrier 34 to the other side thereof. The depth of the guide groove 54 is set such that the image plane of the slide B is at a specific position substantially along the optical axis L (in the direction of focal depth). Further, the slide carrier 34 has an opening formed at the reading position Z likewise the film carrier 32, the opening serving as a mask for permitting the light from the light source section 24 to pass therethrough. Note, a mask may be arranged as an independent member likewise the film carrier 32 and replaced in accordance with a size of the slide B.

A cover 56 is disposed on the upper surface of the slide carrier 34 in the vicinity of the reading position Z. The cover 56 has a through-hole 56a formed in the upper surface thereof to permit the projection light of the slide B to pass therethrough. The cover 56 covers the slide B located at the reading position Z in a normal reading mode but it can open the reading position Z by being turned in the direction of arrow c in the drawing, if necessary. The guide groove 54 which is a little wider than the slide B is formed below the cover 56, sensors are disposed in the inlet of the guide groove 54 and in the vicinity of the reading position Z thereof to detect the extreme end of the slide B which is inserted by the operator or automatically fed by the feed device. Further, a plurality of rollers, for example, six rollers are disposed on each side of the widened portion of the guide groove 54 to feed the slide B. The upper rollers are composed of feed rollers which are rotated at a specific speed by a not shown drive source to feed the slide B and the lower rollers are composed of follower rollers which can urge the slide B upward by an urging device such as springs or the like. Note, a slide presser may be disposed at the reading position Z to press the slide B against the guide groove 54 at the extreme end thereof to correct the distortion and floating of the slide B (the frame thereof) when it is read, if necessary.

A slide recovery box 58 is disposed downstream of the cover 56 (in the direction of arrow x) to recover slides B for which the reading operation has ended. The slide recovery box 58 of the illustrated example is arranged to recover each slide B by causing it to be slid under the already recovered slide B. The slides B having been read are collected by being sequentially laminated from a lower side. Note, the slide recovery box 58 may be a box which accommodates slides B dropped by being pushed by the following slide B fed thereafter or the like in addition to the above.

Figure 4:
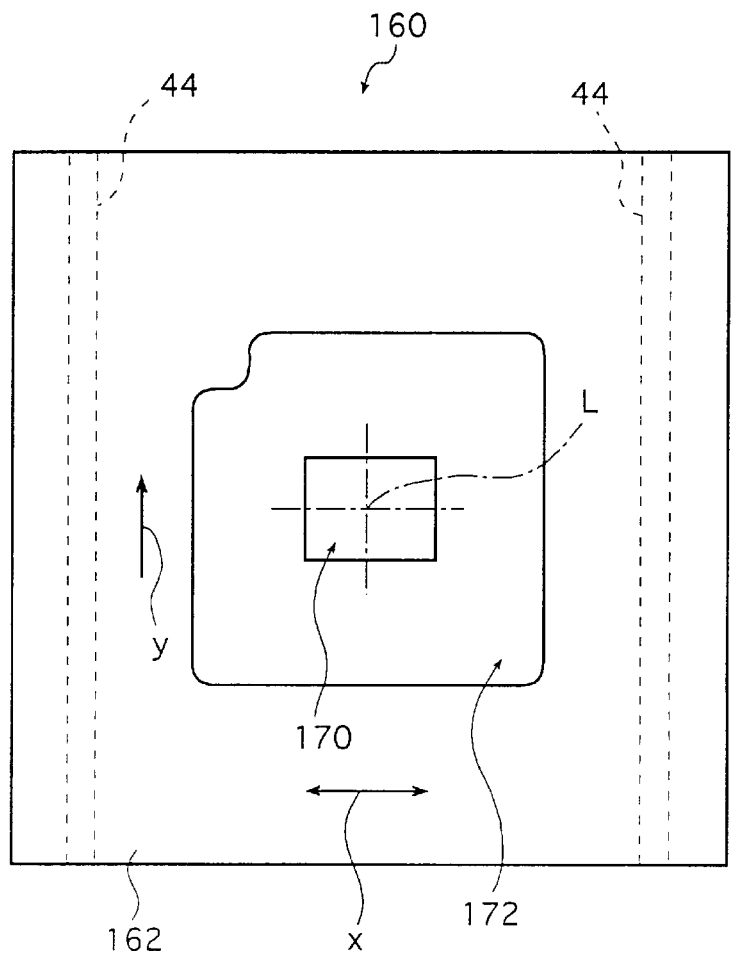
FIG. 4 is a schematic plan view of the carrier main body of a trimming carrier used by the image input device shown in FIG. 2.
Figure 5:
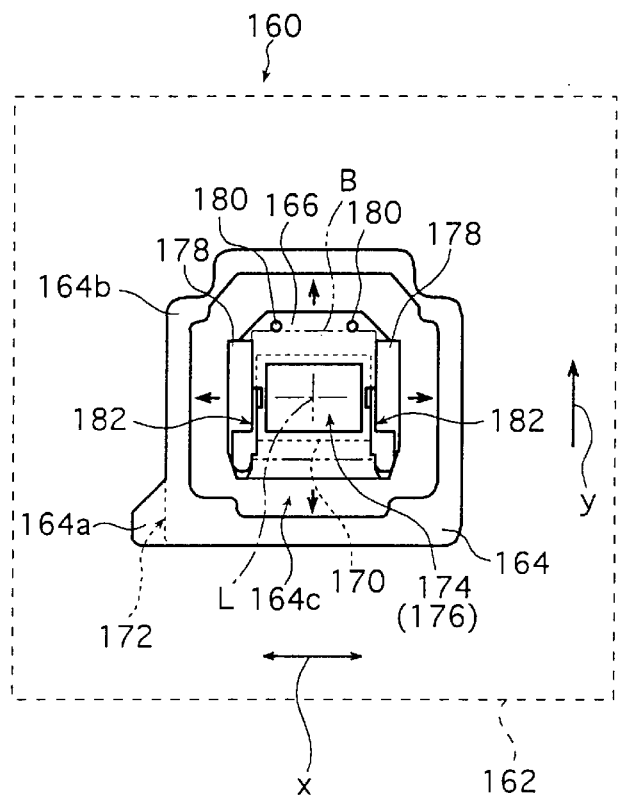
FIG. 5 is a schematic plan view of the trimming carrier used by the image input device shown in FIG. 2.
Figure 6:
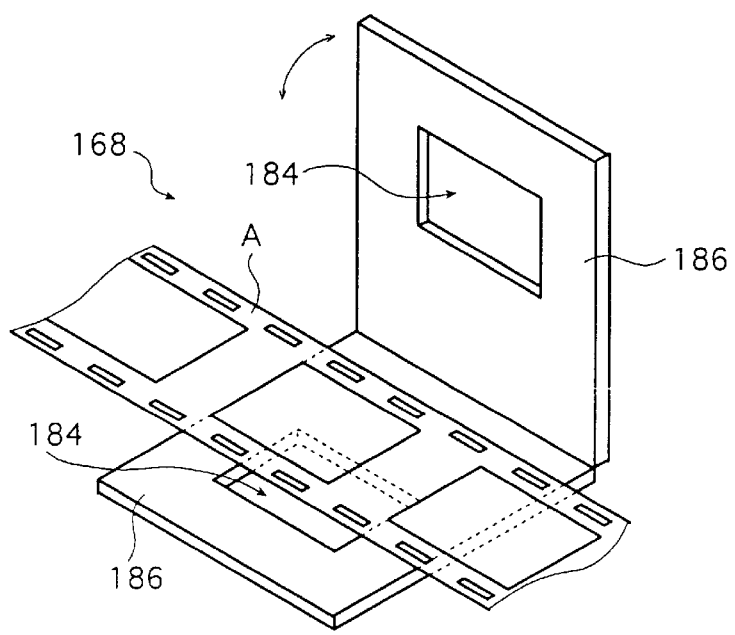
FIG. 6 is a schematic plan view of a strip holding plate used by the trimming carrier shown in FIG. 5.

The trimming carrier 160 shown in FIG. 4 to FIG. 6 is used to be mounted on the carrier base 26 in place of the film carrier 32 shown in FIG. 2 or the slide carrier 34 shown in FIG. 3. This is a carrier for effecting trimming by holding the strip A or the slide B at an arbitrary position and cutting out and enlarging the image of the strip A or the slide B at an arbitrary position thereof. The trimming carrier 160 includes a carrier main body 162 (refer to FIG. 4), a base 164, a slide holding plate 166 (refer to FIG. 5) and a strip holding plate 168 (refer to FIG. 6) which is used in place of the slide holding plate 166.

As shown in FIG. 4, the carrier main body 162 is a rectangular member having an outside shape which is similar to that of the carrier main body of the film carrier 32 and has the grooves 44, 44 formed on the bottom surface thereof in correspondence to the guide rails 42, 42. The carrier main body 162 has a through-hole 170 formed therethrough which permits the reading light from the light source section 24 to pass through it. Further, the carrier main body 162 has a recess 172 which is recessed from the upper surface thereof with the through-hole 170 positioned substantially at the center thereof and the base 164 is loosely inserted into the recess 172 and mounted thereon.

As shown in FIG. 5, the base 164 is composed of a sheet-shaped member mounted on the carrier main body 162 by being loosely inserted into the recess 172 of the carrier main body 162 and has a grip 164a which projects from the recess 172 to the outside when base 164 is mounted on the carrier main body 162 (recess 172) to permit the base 164 to be easily mounted and dismounted. Further, the base 164 has an opening 174 formed substantially at the center thereof to cause the reading light from the light source section 24 of the image input device 12 to pass therethrough.

The base 164 is formed into such a dish-shape that the upper surface thereof other than a peripheral section 164b is formed into a recessed placing section 164c so that the slide holding plate 166 can be movably placed thereon.

The slide holding plate 166 is a sheet-shaped member having a mask opening 176 formed thereinto in correspondence to the image surface of the slide B (shown by a two-dot-and-dash-line in FIG. 5), holds the slide B and is movably placed on the placing section 164c of the base 164 as described above. Therefore, the upper surface of the slide holding plate 166 is formed into such a height that when the slide holding plate 166 is placed on the placing section 164c with a standard slide B placed thereon, the film surface of the holding plate 166 is located at a specific position in the optical axis L.

Regulating members 178, 178 and abutting sections 180, 180 are fixed on the upper surface of the slide holding plate 166 and further a presser member 182 is attached to each of the regulating members 178.

Note, a lubricating member such as a teflon sheet or the like may be disposed in the back surface of the slide holding plate 166, the upper surface of the placing section 164c or both the surfaces thereof or various types of lubricating processing may be applied thereto to enable the slide holding plate 166 to smoothly move on the placing section 164c.

The regulating members 178, 178 are composed of approximately quadrangular-prism-shaped guide members positioned across both the short sides of the opening 176 and extending in the same direction as the short sides and regulate the positions of the confronting end surfaces of the slide B. Therefore, an interval between the regulating members 178 is set in accordance with the maximum size of a slide B which is anticipated to be mounted.

The abutting sections 180, 180 are projections disposed on the upper surface of the slide holding plate 166 in the vicinity of the inner end surface thereof and regulate the inner end surface of the slide B which is perpendicular to the end surfaces regulated by the regulating members 178.

That is, the slide B is inserted between the regulating members 178, 178 in the direction of arrow y until it is abutted against the abutting sections 180, 180 and the position thereof is regulated so that the entire image surface thereof is positioned on the opening 176.

The presser members 182 are pivoted on the inside surfaces of the regulating members 178 so as to turn upward and downward (vertical direction on the sheet of FIG. 5) as well as the ends on the abutting sections 180 side thereof are urged downward so that they are abutted against the upper surface of the slide holding plate 166 and press it. Therefore, the slide B inserted between the regulating members 178 is held by being pressed against the slide holding plate 166 by the presser members 182.

In the illustrated example, the slide B is placed on the slide holding plate 166 in the direction where the image surface thereof is matched with the opening 176, inserted between the regulating members 178, 178 from the side opposite to the abutting sections 180, 180 until it is abutted against the abutting sections 180, 180 and fixed by being pressed against the slide holding plate 166 by the presser members 182. Since the slide holding plate 166 is movably placed on the placing section 164c of the base 164, any arbitrary area of the image of the slide B can be positioned to the optical axis L by moving the slide holding plate 166 in four directions as shown by arrows in FIG. 5.

Although described in detail later, since the imaging unit 28 of the image input device 12 is provided with a zooming function, it can enlarge the projected image of the slide B imaged on the image sensor 30 about the optical axis L and trim any arbitrary area of the image of the slide B of the slide B by positioning a desired area of the image to the optical axis L and adjusting a magnification.

The trimming carrier 160 shown in FIG. 4 and FIG. 5 is a trimming (slide) carrier using the slide holding plate 166 for holding the slide B. However, as shown in FIG. 6, a strip holding plate 168 for clamping the strip A which is composed of two plate members 186, 186 turnably joined to each other by a hinge and have openings 184 corresponding to the image portion of the strip A may be used in place of the slide holding plate 166. When the strip holding plate 168 is placed on the placing section 164c of the base 164, it may be used as a trimming (strip) carrier for trimming any arbitrary area of the image recorded on the strip A.

Note, it is preferable in the present invention that the carrier for disposing the film original in the reading position is arranged as a replaceable carrier which corresponds to each film original having a different type and a different size and any carrier may be used so long as it has an opening formed at the reading position Z thereof to cause the light from the light source section 24 to pass therethrough and grooves formed therein so that they are engaged with the guide rails 42, 42, in addition to the aforesaid film carrier 32 and slide carrier 34 for automatically or semi-automatically feeding the strip A and the slide B to the reading position Z and the trimming carrier 160 for executing trimming. Further, a manual film carrier for permitting the operator to fix the film original at a specific position, a manual slide carrier for feeding the slides B supplied by the operator in the direction of arrow x one by one, stopping them at the reading position Z for reading images and recovering the slides B whose images have been read, and the like may be also employed.

These carriers are provided with a carrier ID code and when they are mounted on the carrier base 26 of the optical frame 13 and electrically connected, the carrier ID code is transmitted to the controller 14.

The imaging unit 28 for imaging the projection light of the strip A and the slide B to the image sensor 30 is disposed in the upper portion of the optical frame 13. The imaging unit 28 includes a zoom lens unit 62, a magnification adjustment motor 63 and a focus adjustment motor 64 which are vertically disposed to a level block 60 fixed to the optical frame 13. The zoom lens unit 62 includes a zoom lens group 66 and a focus lens group 68. The zoom lens group 66 has a known zoom lens assembled thereto which changes an optical magnification in accordance with the size and trimming size of the strip A and the slide B and images the projection light to the image sensor 30 by adjusting the size thereof to a maximum size which can be received by the image sensor 30 (that is, a size which permits a necessary image region to inscribe or nearly inscribe the light receiving surface of the image sensor 30). The focus lens group 68 is positioned above the zoom lens group 66 (downstream in the direction of the optical axis L) and has a known focus adjusting lens assembled thereto which adjusts the focus of the projection light on the light receiving surface of the image sensor 30.

Since the adjustment gear 66a of the zoom lens group 66 is meshed with a gear 63a rotated by the magnification adjustment motor 63 serving as a zooming motor, the movement of the zoom lens group 66 in the direction of the optical axis L is adjusted by the magnification adjustment motor 63 so that the projection light having a size in accordance with an inherent standard optical magnification or an optical magnification set by a method of the present invention is imaged on the image sensor 30. The magnification adjustment motor 63 is driven in an amount determined by a magnification-pulse table stored in a memory 78. Further, since the adjustment gear 68a of the focus lens group 68 is meshed with a gear 64a rotated by the focus adjustment motor 64, the focus of the focus lens group 68 is adjusted by focus adjustment motor 64, that is, it is moved to a focusing position. The focus adjustment motor 64 is driven by being controlled by the automatic focus adjustment device 80 of the controller 14 and the image input device 12 of the illustrated example executes automatic focus adjustment (automatic focusing: AF) by a TTL (through the lens) system using the image read by the image sensor 30 and the contrast thereof. Note, a temperature sensor such as, for example, a thermistor or the like may be attached to the imaging unit 28 for correcting the variation of the focus position of the zoom lens unit 62 caused by the variation of a lens temperature.

The projection light of the strip A and the slide B is imaged on the image sensor 30 by the zoom lens unit 62 and photoelectrically read. Note, a known shutter used to dark current correction and the like may be interposed between the zoom lens unit 62 and the image sensor 30.

In the image input device 12 for two-dimensionally reading an image, the image sensor 30 is an area sensor such as, for example, a CCD sensor having 1380×920 pixels. Further, in the apparatus of the illustrated example, the image sensor 30 is adapted to be movable in both the x- and y-directions by an amount corresponding to half a pixel and this increases the apparent number of reading pixels (reading pixel density) by a factor of up to four.

The image input device 12 is essentially arranged as described above.

The signal from the image sensor 30 is supplied to the controller 14.

As shown in FIG. 1, the controller 14 includes a control unit 70 for controlling the respective sections and the entire section of the image input device 12 and the digital print apparatus 10 of the present invention, a signal processing unit 72 for receiving the signal output from the image sensor 30 of the image input device 12, subjecting the signal to specific signal processing and making the signal to an input image signal, and an image processing unit 74 for subjecting the thus obtained image signal to required or desired image processing and supplying it to the image output device 16 as an output image signal.

The control unit 70 includes a CPU 76, the memory 78, the automatic focus adjustment means 80, image turning control means 82, a negative/positive conversion circuit 84 and the like. The CPU 76 controls not only the signal processing calculation executed by the signal processing unit 72 but also the respective sections and the entire section of the image input device 12 as well as sets and adjusts the optical magnification through the zoom lens and an electronic magnification through image processing in the method of the present invention and changes an image sensor conversion magnification by changing the reading pixel density, if necessary. The memory 78 stores reading optical magnification information, zoom lens moving amount information, image sensor information, carrier information, output pixel density information, print size information, magazine information, amount of output vignetting allowance information, I/O pixel deficit information and the like. The automatic focus adjustment device 80 executes automatic focus adjustment using the image read by the image sensor 30. Further, connected to the control unit 70 are the keyboard 22a, the mouse 22b, the monitor 18 and the like. The keyboard 22a and the mouse 22b instruct the operation of the image input device 12, set reading conditions such as the reading optical magnification, print magnification, image sensor conversion magnification (presence or absence of pixel displacement) and the like, input a print size (size of an output image) and a main subject and indicate color/density correction and the like. The monitor 18 displays the image read by the image sensor 30 and a reference line showing the finishing region of a print.

Figure 7:
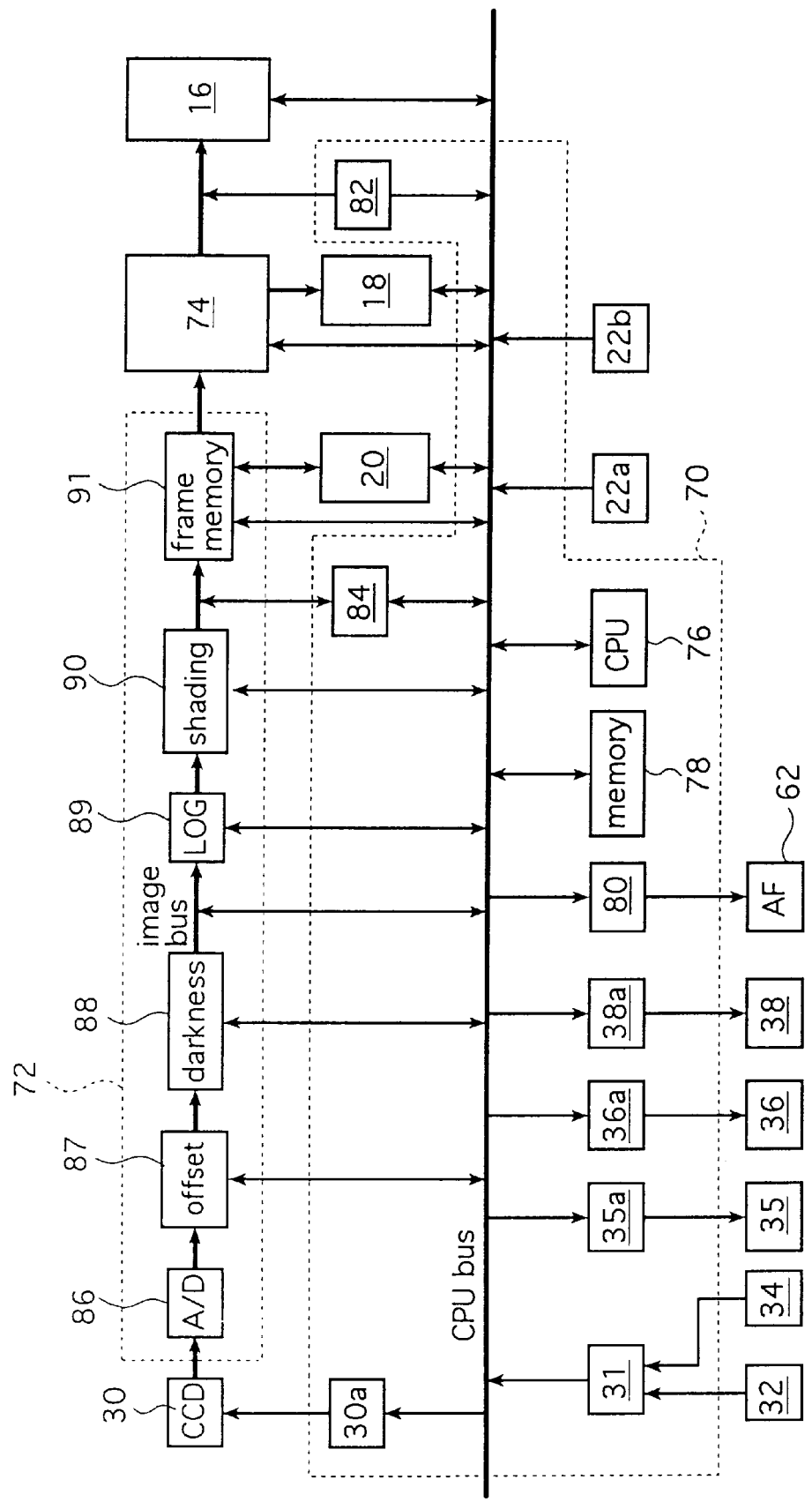
FIG. 7 is a block diagram of an embodiment of a controller of the digital print apparatus shown in FIG. 1.

FIG. 7 shows a detailed block diagram of an embodiment of the control unit 70 and the signal processing unit 72. In the control unit 70, the image sensor (CCD) 30 is connected to a CPU bus through an x - y direction movement control circuit 30a to displace pixels to increase the apparent number of the reading pixels (density). The image information read by the CCD 30 is supplied to the signal processing unit 72. In the signal processing unit 72, the analog image data read by the image sensor 30 is converted into digital image data by an A/D converter 86, subjected to DC offset correction by an offset correction circuit 87 and then subjected to darkness correction by a darkness correction circuit 88. Thereafter, the thus processed image data is subjected to logarithmic transformation by a logarithmic transformation circuit 89 and subjected to shading correction by a shading correction circuit 90 and made to an input image signal which is stored in a frame memory 91 and supplied to the image processing unit 74.

The image data subjected to the darkness correction by the darkness correction circuit 88 is supplied to the automatic focus adjustment device 80. The automatic focus adjustment device 80 first moves the zoom lens unit 62 to respective points spaced apart from each other at specific intervals in a specific search area by controlling the focus adjustment motor 64 to thereby obtain image data subjected to the darkness correction at the respective points and determine an integrated image contrast value. A position where the integrated image contrast value is maximized is determined as a focused position by repeating the above operation and the zoom lens unit 62 is set to the focused position by controlling the focus adjustment motor 64 through the CPU bus.

Carrier ID discrimination means 31 supplies the carrier ID code of any one of the film carrier 32 for the strip A, the slide carrier 34 for the slide B and the trimming carrier 160 being mounted to the CPU 76, the memory 78 and the automatic focus adjustment device 80 through the CPU bus and the keyboard 22a and the mouse 22b supply information such as reading conditions including the registered print size, reading optical magnification, their adjusted values and the like which were supplied, selected, added or corrected, recording conditions including color and/or density correction, dodging correction, gradation correction, and the like thereto through the CPU bus.

Note, the light intensity of the light source 35 of the light source section 24, the degree of opening of the stop (iris stop) 36 and the type of the filters of the color filter plate 38 are controlled, respectively by a light source control circuit 35b, a stop control circuit 36a and a color filter control circuit 38a which are connected thereto through the CPU 76 and CPU bus.

According to the method of the present invention, essentially, the CPU 76 selects and reads out a standard optical magnification stored in the memory 78 in accordance with the carrier ID code supplied from the carrier ID code discrimination means 31, calculates an adjusted optical magnification from a standard optical magnification selected in accordance with the adjusted value of the set optical magnification of the zoom lens unit 62 which was supplied from the data input device 22 with respect to the combination of the carrier ID code (type and size of a film original and mask size) and a print size and calculates an amount of movement (a number of pulses) corresponding to the adjusted optical magnification calculated from a table (LUT) representing, for example, the relationship between the optical magnification stored in the memory 78 and the amount of movement of the zoom lens group 66 of the zoom lens unit 62, that is, the number of pulses applied to the magnification adjustment motor 63.

The CPU 76 determines an output size and an output pixel region (a number of pixels) from the print size, amount of output vignetting allowance, output pixel density and the like which are stored in the memory 78 as well as an input pixel region (a number of pixels) from the effective pixel region (the number of pixels) of the image sensor 30 stored in the memory 78, a mask opening region and the like, calculates the electronic magnification from these I/O pixel regions and the I/O pixel deficit (a number of pixels) stored in the memory 78, determines a cut-out pixel region (a number of pixels) from the effective pixel region of the image sensor 30 using these determined factors and thereafter corrects the output pixel region again by the cut-out pixel region.

According to the present invention, the CPU 76 essentially acts to use both an optical magnification and an electronic magnification (electronic enlargement/reduction) when it changes a print magnification. However, since an emphasis is put on productivity in an ordinary digital print in which no trimming job is executed, even if images recorded on the film having the same film size have different sizes, for example, even if images having a full size (F), a high-vision size (H) and a panorama size (P) are mixedly recorded on a 135 film, the same optical magnification is fixedly used to the film of the same type and the same size, that is, to the film to which the same carrier is used and changes the electronic magnification each time a print size changes. On the other hand, when the trimming job is executed, the CPU 76 realizes a print with less deterioration of image quality by giving precedence to the optical magnification over the electronic magnification by putting greater emphasis on trimming accuracy and image quality than the productivity. However, when the print magnification is less changed by the trimming in the trimming job and emphasis is put on the productivity or when the optical magnification cannot be employed, the CPU 76 gives precedence to the electronic magnification over the optical magnification.

The CPU 76 determines whether pixel displacement is to be executed or not to change the reading pixel density, that is, the pixel density (pitch) of the image sensor 30 in order to output a print having good image quality based on the reproduced image area of the print and a print length, and in particular based on the electronic magnification in trimming.

Note, the print magnification is given as the product of the optical magnification, the electronic magnification and the image sensor conversion magnification. The print magnification represents the magnification of the print size of the reproduced image of an output print to the image size of the film original. The optical magnification represents the magnification of the size of an image projected onto the image sensor 30 by the zoom lens unit 62 to the image size of the film original. The electronic magnification represents the magnification of the number of output pixels (region) to the number of input pixels (region)in consideration of the vignetting caused by the image processing. The image sensor conversion magnification represents the magnification of the output pixel density of the print to the pixel density of the image sensor 30.

The memory 78 stores various information necessary to control the operation of the digital print apparatus 10 of the present invention, the information including carrier information such as the ID code of a carrier mounted on the carrier base 26, the mask size (size information in main- and sub-scanning directions) of the carrier, the size and type of a film set to the carrier, and the like; reading optical magnification information such as a magnification-pulse table showing the position of the zoom lens group 66 of the zoom lens unit 62 (an amount of movement from a home position HP, that is, a number of pulses applied to the magnification adjustment motor 63) which corresponds to the carrier ID code and the standard optical magnification and the set optical magnification corresponding to the carrier ID code; image sensor information such as the size (size information in main- and sub-scanning directions), pixel density, effective pixel region (number) of the image sensor 30; magazine information such as the output pixel density of the image output device 16, registered print sizes (size information of long and short (longitudinal and lateral) sides), the ID code of a magazine loaded on the image output device 16 and the size (width information) and type of a light-sensitive material accommodated in the magazine; information of an amount of output vignetting allowance in consideration of the skew of the light-sensitive material in the feed unit of the image output device 16 and the main scanning length error caused by a light beam scanning device and the like, an input pixel deficit (a number of pixels) caused by image processing by the LPF (low-pass filter) in the image processing unit 74, electronic magnification, etc. in the image processing unit 74, an output image deficit (a number of pixels) caused by image processing by an USM (unsharpness mask), the values of a print image area, print length and the electronic magnification for changing the reading pixel density for image displacement.

Since the image turning control device 82 provided in the control unit 70 is supplied with the information of the light-sensitive material loaded from the image output device 16, in particular the width information of it, the image turning control device 82 determines whether the recording direction of an image to be output, that is, the main scanning direction of it is the longitudinal direction or the lateral direction of a read image and whether the longitudinal direction and the lateral direction of the read image must be converted or not, that is, whether it is necessary to turn the read image 90° or not. When it is necessary to turn the read image, the image turning control device 82 turns it.

Incidentally, the image output device 16 two-dimensionally exposes an elongated light-sensitive material wound to a roll-shape by scan exposing (printing) the light-sensitive material being fed in a sub-scanning direction with a light beam deflected in a one-dimensional direction which approximately perpendicular to the sub-scanning feed direction, that is, in a main scanning direction. As a result, whether the main scanning is executed in the longitudinal direction of a set print size or the lateral direction thereof is unconditionally determined depending upon the width of the light-sensitive material.

On the other hand, the direction of the strip A set to the film carrier 32 and the direction of the slide B set to the slide carrier 34 are fixed in the image input device 12. Thus, when it is intended to make the region of the original image read by the image sensor 30 as large as possible, the direction of the film original, that is, the shape of the original image and thus the shape of the carrier mask (for example, an aspect ratio in particular) are unconditionally determined. Accordingly, there is a case that one line of the original image which is read by the image input device 12 is not matched with one line of the image output device 16 in the main scanning direction. As a result, it is necessary that the image turning control device 82 processes the image signal and turns the image (image region) by 90°; That is, it changes the arrangement of the pixels and converts the access order of a frame memory address based on a conversion formula so that the line direction of the output image matches the line direction of the exposure at least before the image signal stored in the frame memory 91 is exposed with light by the image output device 16.

Further, the control unit 70 is provided with the negative/positive conversion circuit 84 for subjecting the image data having been subjected to the specific signal processing by the signal processing unit 72 to positive/negative conversion. When the strip A and the slide B are a reversal film, the negative/positive conversion circuit 84 converts the image information having been subjected to specific image processing to a negative image and outputs it as the negative image (vice-versa) before the image information is supplied to the image output device 16. A method of positive to negative and negative to positive conversion is not particularly limited and any known method (image processing method) may be used.

Although whether the strip A and the slide B are a negative film or a reversal film is determined in the present invention from the information stored in the memory 78 based on the carrier ID code which is transferred from the carrier ID code discrimination means 31 when a carrier is mounted, the method of determination is not limited to the above arrangement and the operator may input the type of the strip A and the slide B.

Figure 8:
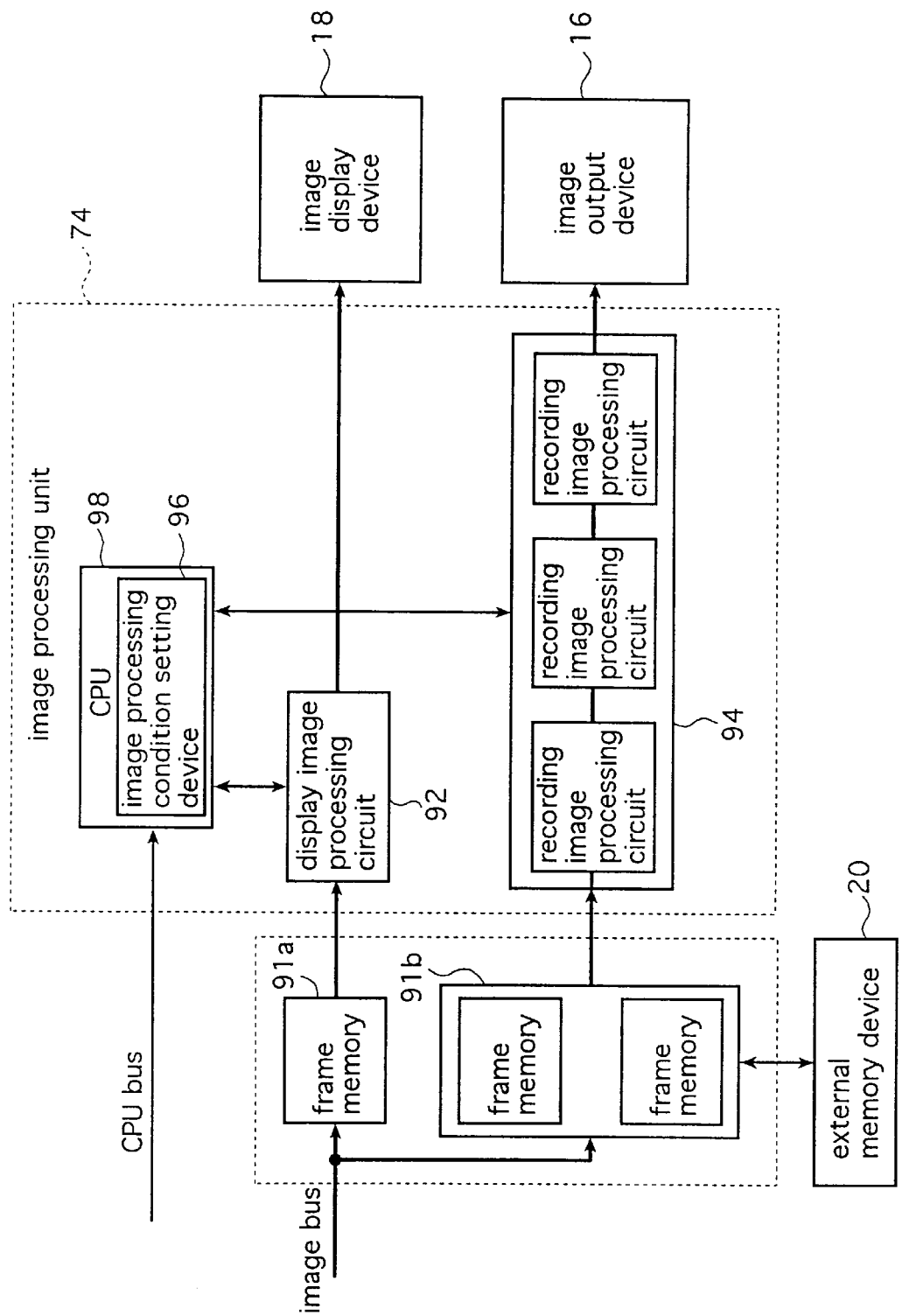
FIG. 8 is a block diagram of an embodiment of an image processing device of the controller shown in FIG. 1.

Various types of conventional printers ordinarily execute pre-scanning for roughly reading the original image in order to set image processing conditions and the like prior to the precise reading (main scanning) of the original image for outputting an image. For this purpose, the frame memory 91 of the signal processing unit 72 shown in FIG. 7 includes a pre-scanning frame memory 91a and a main scanning frame memory 91b arranged as a toggle memory as shown in FIG. 8. The image processing unit 74 used in the present invention applies necessary image processing to the image signal of the film original stored in the frame memories 91a, 91b, for example, to the image signal of the three primary colors R, G, B of a single image.

As shown in FIG. 8, the image processing unit 74 includes a display image processing circuit 92 for subjecting the pre-scanned image signal stored in the pre-scanning frame memory 91a, for example, a G color image signal to image processing for displaying it on the monitor 18; a recording image processing circuit 94 for cutting out the image signal of the pixels of the cut-out pixel region (the number of pixels) which is determined by the method of the present invention from the main-scanned image signal stored in the main scanning frame memory 91b to supply the image signal to the image output device 16, subjecting the thus cut-out image signal to proper image processing for print, subjecting it to LPF (low-pass filter) processing for dodging, subjecting the cut-out pixel region (the number of pixels) to enlargement/reduction processing according to the electronic magnification determined by the method of the present invention, and executing USM (unsharpness mask) processing for making an image acute thereby to provide an output image signal; and a CPU 98 for constituting image processing, condition setting device 96 for setting the image processing conditions of the main-scanned image signal in the recording image processing circuit 94 from the pre-scanned image signal, a main subject set if necessary and desired processing conditions input by the operator.

Although the image is read by the image input device 12 and processed by the controller 14 in the illustrated example, the present invention may execute processing similar to the above processing by reading an image signal stored in a memory medium such as a server, a hard disc, a magnetic-optical disc, a floppy disc and the like as the external memory device 20, in addition to the above arrangement. On the contrary, the image signal stored in the frame memory 91 may be stored in the external memory device 20 so that it is used later.

The controller 14 of the present invention is essentially arranged as described above.

Next, the image output device 16 receives an image signal from the controller 14, deflects light beams for exposing red (R), green (G) and blue (B) which were modulated by the image signal in a light beam scanning device, for example, a laser scanner in the main scanning direction as well as draws out an elongated light-sensitive material wound to a roll shape from a magazine by the feed unit and feeds it in the sub-scanning direction perpendicular to the main scanning direction to thereby two-dimensionally scan expose the light-sensitive material, subjects the thus exposed light-sensitive material P to color development processing in a development device and further to bleaching/fixing processing and wash processing, dries the light-sensitive material in a drier and cuts it to respective frames by a discharge device and outputs the light-sensitive material as prints.

The digital print apparatus 10 shown in FIG. 1 can set a plurality of sizes to a film original serving as a subject to be processed and a print to be output, that is, the apparatus 10 can set the plurality of sizes of the film original and the plurality of sizes of the print to the memory 78 of the controller 14 shown in FIG. 7 through the CPU 76, and the sizes of the film original can be arbitrarily combined with the sizes of the print.

For example, even the standard print size of the 135 film includes three types of sizes, namely, the L size (89 ×127 mm), H size (89×158 mm) and panorama size (89×250 mm) in correspondence to the sizes of images recorded on the film such as the full size (F), high-vision size (H) and panorama size (P). Further, even the standard print size of the 240 film includes the C (classic) size, H (hi-vision size) and P (panorama) size likewise depending upon the difference in recorded image sizes. Although there are of course many other print sizes in addition to the above print sizes, it is needless to say that the digital print apparatus 10 of the illustrated example for embodying the present invention can cope with these many print sizes.

In an ordinary digital print, each film original has a dedicated carrier depending upon its size and its type (refer to the film carrier 32 in FIG. 2 and the slide carrier 34 in FIG. 3) and the carrier can be mounted on and dismounted from the carrier base 26 of the image input device 12 shown in FIG. 2. When a carrier, for example, the film carrier 32 is mounted on the carrier base 26 as shown in FIG. 2, the carrier ID code of the film carrier 32 is transmitted to the CPU 76 and recognized by it. At the same time, the magazine ID code of a magazine loaded on the feed unit of the image output device 16 is transmitted from the image output device 16 to the CPU 76 and recognized by it. Although the memory 78 of the controller 14 stores the mask size information of the film original, the width information of the light-sensitive material and the like, these types of the information cannot be rewritten by the user.

Although a plurality of print sizes to be output are set to the memory 78 when the apparatus is shipped from a factory, these print sizes registered to the memory 78 are display on the screen of the monitor 18 as a print size list and the user selects a desired print size displayed on the screen of the monitor 18 by means of the data input unit such as the keyboard 22a and the mouse 22b. When the desired print size is not registered, the user can register a new print size or correct a registered print size using the keyboard 22a or the like and further can rewrite the content of the memory 78.

As to the optical magnification of the zoom lens in the digital print apparatus 10 of the illustrated example, standard optical magnifications which can be unconditionally determined only by the carrier ID codes are stored in the memory 78 when the apparatus is shipped from the factory.

When a carrier ID code and a magazine ID code are obtained and an output print size is selected in the digital print apparatus 10, a magnification is automatically calculated by the CPU 76 and the optical magnification of the zoom lens and the electronic magnification are automatically set. That is, first, a standard optical magnification which is inherent to the carrier ID code is automatically set as the optical magnification of the zoom lens from the memory 78. Then, when no trimming is executed in the present invention, in particular when the film original is read in an automatic or semi-automatic mode, the optical magnification can be fixed to the standard optical magnification or a set optical magnification after fine adjustment. How the optical magnification and the electronic magnification are calculated will be described later.

In the digital print apparatus 10 of the illustrated example, the image signal captured in prescanning from the entire pixels of the effective pixel region (for example, 1380 pixels×920 pixels) of the image sensor 30 to which an image born by the film original is projected is captured to the frame memory 91 (prescanning frame memory 91a) of the signal processing unit 72 of the controller 14 and thinned and then displayed on the monitor 18 (for example, 345 pixels×230 pixels).

In main (fine) scanning, the image signal of the entire pixels of the effective pixel region of the image sensor 30 is captured likewise. However, since the film original has a plurality of sizes and thus the mask also has a plurality of sizes, the image projected from the mask image (original image in the open region of the mask) of all the film originals is not projected to the entire effective pixel region of the image sensor 30 and in general projected inwardly of it. Accordingly, the image signal of the pixels only in the mask image region must be taken out from the image signal of the entire pixels in the effective pixel region to which the image is read as the image signal of the pixels in the input pixel region so that the image signal is used to reproduce a print. Therefore, the present invention sets the size (the number of pixels) of the input pixel region to the size (the number of pixels) of the effective pixel region of the image sensor 30 in such a manner that the image signal of the pixels at the edges of the film original and the mask can be surely removed even if the dislocation of the optical axis, a magnification error, a film original stop position error and the like are taken into consideration and the image signal of the pixels as many as possible in the opening region of the mask can be surely taken out and can be captured to the frame memory 91 (91b) as the image signal of the pixels in the input pixel region. Note, the image signal of the entire pixels of the effective pixel region of the image sensor 30 may be captured to the main scanning frame memory 91b and only the image signal of the pixels of the input pixel region may be read out.

Likewise, in the optical system of the image input device 12, the standard optical magnification is set so that the image projected from the mask image of the film original can be surely and sufficiently accommodated within the effective pixel region of the image sensor 30. Therefore, the standard optical magnification is an optical magnification which ensures that the mask image of the film original is surely projected to the effective pixel region of the image sensor 30, the edge of the film original never appears on a print or the edge of the mask is never recorded on the print when the print is output in a desired print size, the effective pixel region of the image sensor 30 is sufficiently used and fine image quality is obtained. When the zoom lens unit 62 is actually set to the standard optical magnification, the CPU 76 reads out, from the magnification-pulse table stored in the memory 78, a number of pulses from an origin (home position) which is applied to the magnification adjustment motor 63 to obtain an amount of movement from the origin which is necessary to move the zoom lens group 66 of the zoom lens unit 62 to a position where the set optical magnification is realized and the magnification adjustment motor 63 is driven by the number of pulses to thereby move the zoom lens group 66 and stop it at the position where the standard optical magnification is realized.

Next, the CPU 76 calculates the electronic magnification (for example, 120%) for creating the image signal of the pixels of the output pixel region (for example, 1531 pixels× 1082 pixels) which is necessary to output a print having a desired print size (for example, 127 mm×89 mm) at a specific output pixel density (for example, 300 dpi) from the image signal of the pixels of the input pixel region (for example, 1340 pixels×920 pixels) using various set values which were set when the apparatus was shipped from the factory and in consideration of, for example, an amount of output image vignetting allowance such as the skew and recording length error of the light-sensitive material of the image output device 16 and the pixel deficit (vignetting) in the image processing unit 74 in accordance with the output print size, reads the image signal of the pixels to the signal processing unit 72 in consideration of the vignetting, determines the pixel region (for example, 1292 pixels×918 pixels) which will be cut out from the effective pixel region of the image sensor 30 and captured to the frame memory 91 (91a, and 91b if necessary) and displays a finished print region (for example, 323 pixels×229 pixels) as the reference line on the monitor 18 (for example, 345 pixels×230 pixels).

In the digital print apparatus 10 of the illustrated example, the image in the finished print region within the reference line displayed on the monitor 18 is output from the image output device 16 as it is.

When, however, it is desired to change the region of the original image which is reproduced on a print, that is, when it is desired to reproduce a part of the original image on the print or when it is desired to adjust an amount of vignetting of the original image in the image reproduced on a print, a trimming job can be executed. The trimming job can be executed by various methods in the present invention. The trimming method can be divided into, for example, a method of using the film carrier 32 and the slide carrier 34 from the point where the film original is positioned and a method of using the trimming carrier 160. There are also a method of giving precedence to the optical magnification achieved by the zooming operation of the zoom lens unit 62 from the view point of a print magnification, a method of giving precedence to the electronic magnification achieved by image processing, a method of using both the methods, and the like. When it is desired to adjust the amount of vignetting of the original image, although it is preferable that the user adjusts the optical magnification from the standard or set optical magnification by zooming operation by using the film carrier 32 and the 34 while observing the original image displayed on the monitor 18, the user may also use the trimming carrier 160.

When only a part of the original image is trimmed, it is also possible to move the reference line (cursor) showing a finished print region on the monitor 18 through the keyboard 22a and the mouse 22b and enlarge or reduce the electronic magnification by changing it and match the finished print region with a trimming region using the film carrier 32 and the slide carrier 34 while remaining the standard or set optical magnification as it is or after the optical magnification is adjusted by the zooming operation while the image region which is trimmed and printed is within the effective pixel region of the image sensor 30 or preferably until the trimming region inscribes or nearly inscribes the effective pixel region.

When the trimming carrier 160 is used, the trimming job can be executed using the electronic magnification or both the optical magnification and the electronic magnification. In this case, however, since the position of the film original can be freely adjusted, the center of the trimming region of the image of the film original can be caused to match with the center of the effective pixel region of the image sensor 30. Accordingly, it is preferable to cause the trimming region of the original image to match with the reference line in the image displayed on the monitor 18 by changing the optical magnification so that the trimming region is increased as large as possible until it inscribes the effective pixel region of the image sensor 30.

Although the present invention essentially executes trimming by switching the method of giving preference to the optical magnification and the method of giving preference to the electronic magnification, it is preferable to give preference to the optical magnification as far as possible and switch the optical magnification to the electronic magnification only when the optical magnification approaches its limit, in order to obtain a print whose image quality is less deteriorated without a blurred feeling. In particular, when a print has a low magnification and the optical magnification is possible, it is preferable to execute trimming by changing only the optical magnification while fixing the electronic magnification or setting it to a possible minimum value, whereas in the region where the optical magnification is impossible, it is preferable to achieve a desired print magnification by fixing the optical magnification to its possible limit value and switching it to the electronic magnification.

Even if the above method is employed, when a print has a high magnification, the electric magnification is increased and image quality is deteriorated. To deal with this problem, it is preferable to prevent or reduce the deterioration of the image quality by changing the reading pixel density by displacing pixels in accordance with the electronic magnification.

The trimming job executed by the optical magnification can be carried out in such a manner that the user directly indicates an optical magnification, the user indicates the print magnification and the CPU 76 calculates and sets the optical magnification, or the user indicates the start and stop of zooming which is executed by the magnification adjustment motor 63. In these cases, it is preferable that an actually set magnification is displayed on the monitor 18. After the above factors are indicated, the use confirms the image in a specific trimming region by the image of the image sensor 30 in the print and a finished print region, namely, a reference line showing the trimming region which are displayed on the monitor 18. When a desired trimmed image is not obtained, the user can repeat the trimming job for adjusting the optical magnification until the desired trimmed image is obtained. It is needless to say that the user may indicate the stop of the magnification adjustment motor 63 when the desired trimmed image region is matched with the region within the reference line by the continuous zooming of the zoom lens unit 62 executed by the magnification adjustment motor 63 while observing the enlargement and reduction of the original image displayed on the monitor 18.

In the present invention, since the reference line displayed on the monitor 18 sufficiently takes image vignetting (pixels) caused by the image processing executed until the original image read by the image sensor 30 is reproduced on the print into consideration, the reproduced image actually printed on the print is not almost displaced. Thus, it is sufficient to confirm the trimmed image on the monitor 18. It is needless to say that the trimming job may be executed while actually outputting the print.

Incidentally, when the desired trimmed image is obtained and reproduced on the print and the trimming job is finished, the optical magnification which has been set by being subjected to the specific adjustment to obtain the original image reproducing region of the print returns to the standard optical magnification which is inherently preset to the digital print apparatus. As a result, when it is desired to adjust original image reproducing regions on a print to all the original images recorded to a type of a film original, for example, a reversal film, although it is possible to adjust the reproducing regions by executing the trimming job to each of the original images, it is very trouble some to execute the trimming job to all of the original images.

To deal with this problem, the digital print apparatus of the illustrated example permits the original image reproducing region on a print to be set to a specific region at all times in accordance with the preference of the user. This is realized in the present invention by setting an amount of adjustment, that is, a magnification fine adjustment value to the preset standard optical magnification. That is, the magnification fine adjustment value is made variable to the standard optical magnification between a maximum value and a minimum value which are inherent to the image input device 12. Thus, the optical magnification can be set to a specific set optical magnification by setting the magnification fine adjustment value to a specific value between the maximum value and the minimum value. Note, when the optical magnification is set to the standard optical magnification, the magnification fine adjustment value is set to 100%, whereas when it is desired to fix the optical magnification to the standard optical magnification, it suffices only to fix the magnification fine adjustment value to 100%.

Figure 9:
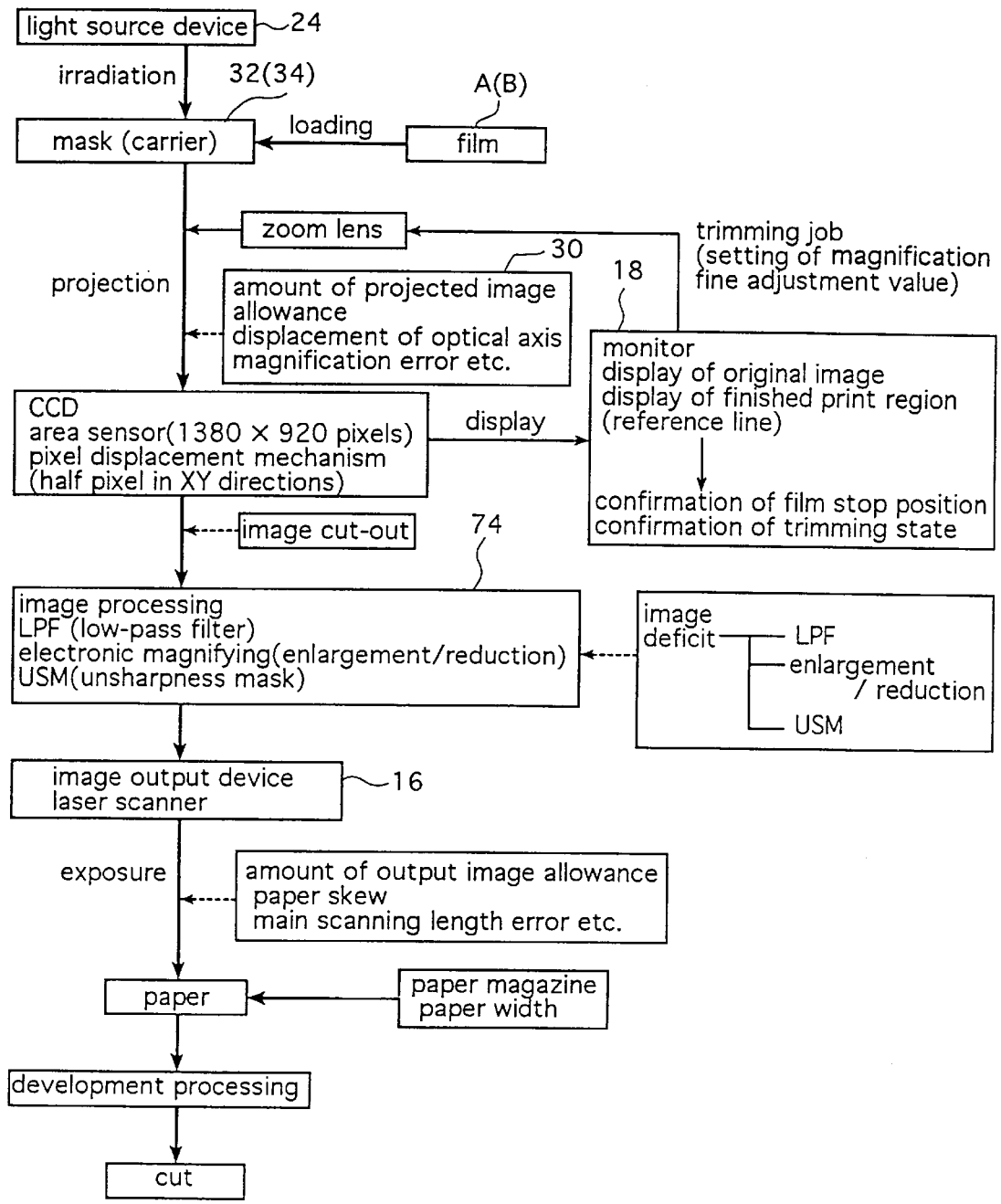
FIG. 9 is a block diagram showing an example of the essential process of the digital print method according to the present invention.

Although the digital print apparatus of the present invention is essentially arranged as described above, a digital print method of the present invention will be described below in detail with reference to FIG. 9, FIG. 10 and FIG. 11. FIG. 9 is a block diagram showing an example of a basic process for embodying the digital print method of the present invention, FIG. 10 is a flowchart showing an embodiment of an optical magnification setting method in the method of the present invention and FIG. 11 is a flowchart showing an embodiment of an electronic magnification calculation method and a method of cutting-out a cut-out pixel region.

First, in the digital print apparatus 10 shown in FIG. 1, the CPU 76 of the controller 14 shown in FIG. 7 obtains the carrier ID code of a carrier mounted on the carrier base 26 of the image input device 12 shown in FIG. 2 therefrom and the magazine ID code of a magazine mounted on the feed unit of the image output device 16 shown in FIG. 1 therefrom, reads the mask size information of a film original and the width information of a light-sensitive material, and the like from the memory 78 of the controller 14 and displays them on the monitor 18.

Figure 10:
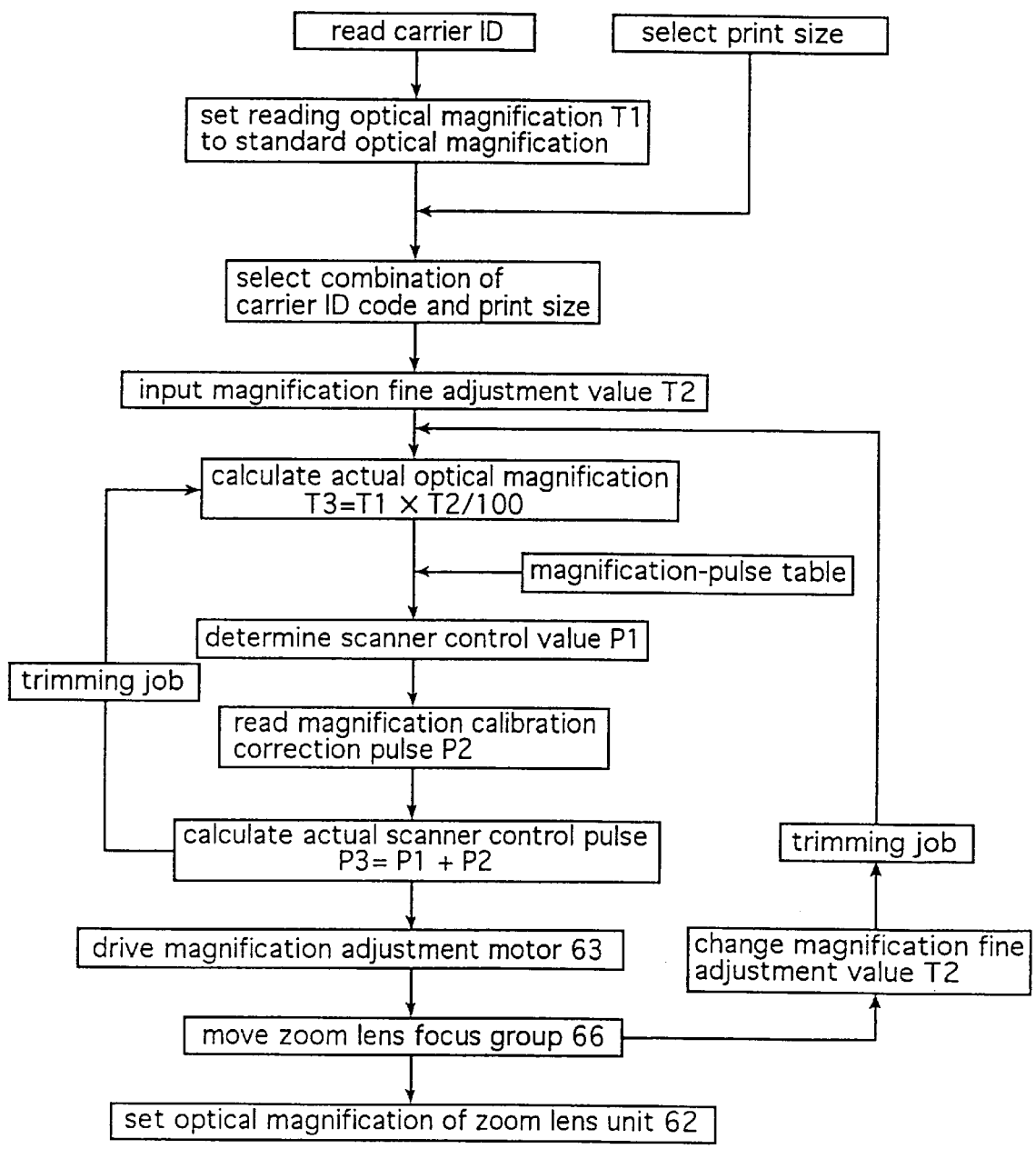
FIG. 10 is a block diagram showing an embodiment of a method of determining an electronic magnification and a cut-out pixel region in the digital print method according to the present invention.
Figure 11:
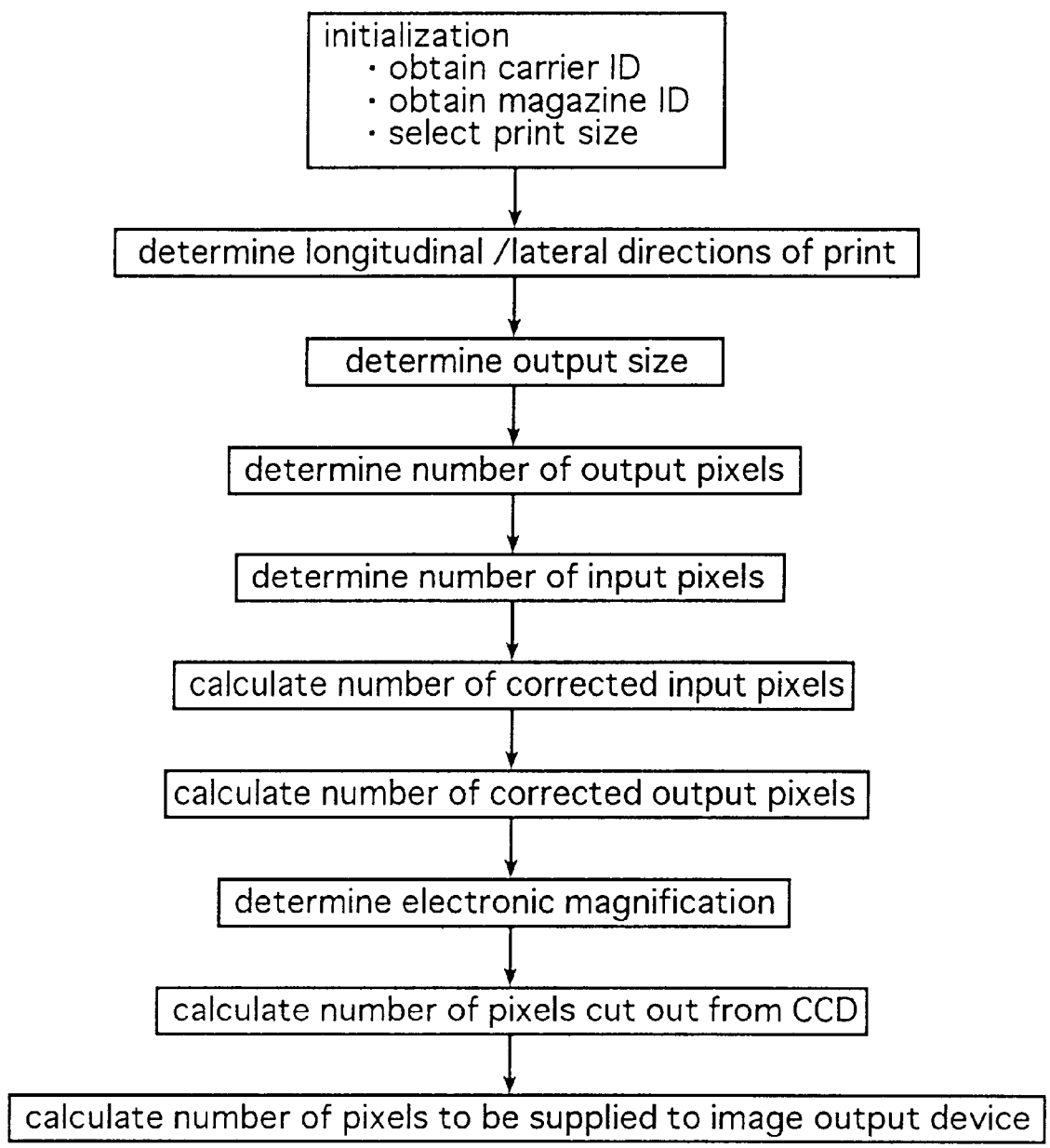
FIG. 11 is a block diagram showing an embodiment of an optical magnification setting method in the digital print method according to the present invention.

The operator selects a desired print size registered in the memory 78 on the screen of the monitor 18 using the keyboard 22a and the mouse 22b and if the desired print size is not registered, the operator adds or corrects the desired one and executes necessary operation for setting other conditions and the like, whereby initialization executed by the CPU 76 is finished as shown in FIG. 10 and FIG. 11.

First, how the optical magnification is set will be described with reference to FIG. 9 and FIG. 10. As shown in FIG. 10, it is assumed that the carrier holding a film original for which the original image reproducing region on the print is desired to be set to the specific region is mounted on the image input device 12 and the CPU 76 reads and recognizes the carrier ID code of the carrier as the reading means thereof and reads and selects a standard optical magnification corresponding to the carrier ID code as a reading optical magnification T1 from the memory 78.

When the user selects a magnification adjustment mode from a menu, a list of carriers and print sizes is displayed on the monitor 18. The user selects a combination of a target carrier (the carrier ID code of which is recognized) and a target print size through the data input device 22 and inputs an amount of adjustment, namely, a magnification fine adjustment value T2 to the combination. Although the magnification fine adjustment value T2 is set (stored) to 100% as a default value when the apparatus was shipped from the factory, the user can inputs a numeral in the range of 50% to 150% as the default value. When the numeral of the magnification fine adjustment value T2 is input by the user, the value of the magnification fine adjustment value T2 stored in the memory 78 in correspondence to the combination of the carrier ID code and the print size is updated.

Next, the CPU 76 calculates an actual optical magnification T3 which is actually set according to the following formula from the reading optical magnification T1 as the calculation of an adjustment optical magnification for adjusting the optical magnification of the zoom lens unit 62 and the magnification fine adjustment value T2.

$$T3 = T1 \times T2/100$$

Next, the CPU 76 refers to the magnification-pulse table in the memory 78 as means for calculating an amount of movement of the zoom lens group 66 and converts the actual optical magnification T3 calculated by the above formula into a scanner control value P1 which is represented by the number of pulses to be applied to the magnification adjustment motor 63 for moving the zoom lens group 66 from the origin (home position). Since the magnification-pulse table is set as a design value, it is similarly arranged to any apparatuses. However, since the apparatuses are inevitably arranged differently due to a part error, an assembly error, an adjustment error and the like, a magnification calibration correcting pulse P2 which is inherent to each of the apparatuses to compensate the difference of the arrangement of the respective apparatuses in the actual optical magnification T3 is read from the memory 78 and an actual scanner control value P3 which is represented by the number of pulses actually applied to the magnification adjustment motor 63 is determined from the following formula. Note, the magnification calibration correcting pulse P2 is an adjustment parameter for compensating the difference in arrangement of the respective apparatuses when they are shipped from the factory.

$$P3 = P1 + P2$$

The zoom lens group 66 is moved by driving the magnification adjustment motor 63 by the thus obtained actual scanner control value P3 to thereby set the optical magnification of the zoom lens unit 62 to the actual optical magnification T3. Thereafter, the display screen of the monitor 18 returns to a print screen, the image of the film original is read by the image sensor 30 in the input device 12 and a prescanned image is displayed on the monitor 18. When a trimming job is not executed, since the optical magnification and thus the magnification fine adjustment value is set to 100% or a fixed value, the setting of the optical magnification is finished.

When, however, the trimming job is executed, the user compares the original image display region thus displayed on the monitor 18 with a reference line showing a finished print region or actually outputs a main scanned and read image from the image output device 16 as a print, visually confirms how the original image reproducing region is adjusted on the print, and if necessary, repeats the trimming job until a desired original image reproducing region is obtained on a desired print.

In the present invention, since the reference line displayed on the monitor 18 sufficiently takes the image vignetting, caused until the original image read by the image sensor 30 is reproduced on the print, into consideration, the range of the image in the finished print region shown by the reference line is not displaced from the range of the reproduced image actually printed. Thus, it is needless to say that the adjusted state may be confirmed on the monitor 18 or the actually output print may be confirmed by actually outputting the print.

Note, the magnification fine adjustment value T2 may be determined by calculation in such a manner that an original provided with a measurable scale is used as the film original, the original with the scale is displayed on the monitor 18 or actually printed out and the displayed or the output scale is measured.

As described above, the magnification fine adjustment value T2 of the inherent standard optical magnification T1 can be set as the default value of the digital print apparatus 10 in correspondence to the combination of a type of a carrier (a size of a film original) and a print size to obtain an original image reproducing area desired by the user regardless of that trimming is executed or not. Thus, when the same combination is selected, since a particular magnification fine adjustment value T2 stored in the memory 78 is read out, the same original image reproducing region desired by the user can be obtained on a print. When it is desired to return the standard optical magnification to its initial state at the time the apparatus was shipped from the factory, the value stored in the memory 78 can be easily returned to its original state by setting the magnification fine adjustment value T2 to 100% again.

The method of adjusting the set optical magnification according to the present invention is essentially arranged as described above.

Next, how the electronic magnification is calculated and how the cut-out pixel region is cut out according to a method of the present invention will be described. As shown in FIG. 11, when the print size is set as described above, the CPU 76 determines whether the image must be turned by 90° by the image turning device 82 or not from the width information of the light-sensitive material and the longitudinal side and the lateral side of the print is determined. When, for example, a light-sensitive material has a width of 127 mm and the print size is an L size (long side (H) 127 mm×short side (V) 89 mm), the image need not be turned when it is output because main scanning is effected along the long side and sub-scanning is effected along the short side. However, when the print size is a 2L size (long side (H) 178 mm×short side (V) 127 mm), since the main scanning is effected along the short side and the sub-scanning is effected along the long side when the image is output, the image must be turned.

This will be described below with reference to a case that the print size is the L size as a typical example. That is,

| print size | long side; HO0 = 127 mm |
|---|---|
| | short side; VO0 = 89 mm |

Next, in the determination of the cut-out pixels in the present invention, when an output pixel region is calculated, output sizes HO1, VO1 are determined by adding, to the print size, amounts of output vignetting allowance Ox, Oy, for example, 2.5 mm for both of them which were preset as a design parameter inherent to the image output device 16 and read out by the CPU 76 directly from the image output device 16 or through the memory 78. As shown in FIG. 7, the amounts of output vignetting allowance for an output image are values added due to the skew of the light-sensitive material in the image output device 16, a main scanning length error and the like.

output size long side; HO1=HO0+Ox or Oy=129.5 mm
short side; VO0=VO0+Oy or Ox=91.5 mm Next, the output pixel region (the number of pixels) will be determined by dividing the output sizes by an output pixel density RO, for example, 300 dpi (=0.08467 mm) which is read from the image output device 16 directly or indirectly through the memory 78 likewise the above (in the example, all digits to the right of the decimal point are rounded up to make the quotient to an integer).

output pixel region long side;

$HO2 = HO1 \div RO$ $= 1530$ pixels short side;

$VO2 = VO1 \div RO$ $= 1081$ pixels

In the determination of an input pixel region, calculation will be executed so that the mask opening region determined from a preset mask size inscribes or nearly inscribes the preset effective pixel region (for example, 1380 pixels (main)×920 pixels (sub) and when pixels are increased by a factor of four by a pixel displacement mechanism, 2760 pixels (main×1840 pixels (sub)) of the image sensor 30 (hereinafter, referred to as a CCD) to thereby determine the input pixel region (the number of pixels) captured to the main scanning frame memory 91b of the signal processing unit 72.

When the aspect ratio (main/sub ratio) of the effective pixel region of the CCD is larger than the aspect ratio (main/sub ratio) of the mask opening region:

input pixel region long side;

$H10 =$ CCD effective pixel region (main) × mask opening region aspect ratio $= 1340$ pixels short side;

$V10 =$ CCD effective pixel region (sub)

$= 920$ pixels

Whereas, when the aspect ratio (main/sub ratio) of the effective pixel region of the CCD is smaller than the aspect ratio (main/sub ratio) of the mask opening region:

input pixel region long side;

$H10$ = CCD effective pixel region (main) short side;

$V10$ = CCD effective pixel region (sub) ÷ mask opening region aspect ratio

Next, in the determination of the cut-out pixel region, the input pixel region is corrected by subtracting an input pixel deficit Ek0 (for example, 5 pixels in total) which is vignetted by various types of image processing such as the low-pass filter (LPF) processing applied to an input image signal by the recording image processing circuit 93 of the image processing unit 74, enlargement/reduction processing and the like from the thus determined input pixel region.

corrected input pixel region long side;

$H11 = H10 - Ek0$
$= 1335$ pixels short side;

$V11 = V10 - Ek0$
$= 915$ pixels

On the other hand, the output pixel region is corrected by adding an output pixel deficit Ek1 (for example, 14 pixels) which is vignetted (removed) from the previously determined output pixel region by image processing such as unsharpness mask (USM) processing to the image signal and the like.

corrected output pixel region long side;

$H12 = HO2 + Ek1$
$= 1544$ pixels short side;

$V12 = VO2 + Ek1$
$= 1095$ pixels

The electronic magnification is determined by dividing the thus determined corrected output pixel region by the corrected input pixel region as to each of the long side and the short side. In the example, the quotients are rounded up at the third digit to the right of the decimal point thereof in consideration of adjustment accuracy and the larger one of the values for the long side and the short side is employed as the electronic magnification.

electronic magnification $Me = MeV$
$= 1.20 \ (= 120\%)$ long side;

$MeH = H12 \div H11$
$= 1.16 \ (= 116\%)$ short side;

$MeV = V12 \div V11$
$= 1.20 \ (= 120\%)$

The pixel region (the number of pixels) to be cut out from the input pixel region stored in the frame memory 91*b* is calculated using the electronic magnification Me so that it is made to the corrected output pixel region (rounding-up is also effected here to provide an integer).

cut-out pixel region long side;

$HFB = H12 \div Me + Ek0$
$= 1292$ pixels short side;

$VFB = V12 \div Me + Ek0$
$= 918$ pixels

Next, in the re-correction of the output pixel region, the output pixel region to be supplied to the image output device 16 is determined using the thus obtained cut-out pixel region (rounding-up is also effected here to provide an integer).

output pixel region long side;

$HO3 = (HFB - Ek0) \times Me - Ek1$
$= 1531$ pixels short side;

$VO3 = (VFB - Ek0) \times Me - Ek1$
$= 1082$ pixels

The input pixel region (the number of pixels) which is cut out from the frame memory 91*b* in which the image born by the film original and read by the image sensor 30 is stored as the image signal and the output pixel region (the number of pixels) which is supplied to the image output device 16 are determined as described above.

As shown in FIG. 9, the monitor 18 instantly displays the image of the film original read by the image sensor 30 in the prescanning as it is. However, the number of pixels (the pixel density) which can be displayed on the monitor 18 is limited, smaller than the number of pixels read by the image sensor 30 and lower than the reading pixel density. In the example, the number of reading pixels of the image sensor 30 is 1380 pixels×920 pixels, whereas the number of display pixels of the monitor 18 is, for example, 345 pixels×230 pixels, thus the latter is one fourth the former. As a result, the stop position of the film original can be confirmed in real time, that is, it can be confirmed in real time whether the film original correctly stops at the reading position Z of the carrier. Further, as shown in FIG. 9, the monitor 18 displays the aforesaid cut-out pixel region as the reference line showing the finished print region. Thus, the image of a finished print can be confirmed and even if trimming which will be described later is executed, a trimming state can be simply and correctly confirmed.

In the print bearing image reproduced using the image signal of the pixels of the thus obtained output pixel region, the vignetted amount of the film original bearing image which is removed from the image surface of the film original until the image is reproduced to the image surface of the print is minimized except the inevitably vignetted amount which is previously taken into consideration as shown in the essential process of FIG. 9. That is, the vignetting of the image such as the amount of output vignetting allowance in the image output device 16, the pixel deficit in the image processing unit 74 and the like is previously taken into consideration and the amount of vignetting allowance of the image projected to the image sensor (CCD) 30 such as the displacement of the optical axis of the zoom lens unit 62, the optical magnification error and the like is minimized as well as previously taken into consideration. For example, the mask whose opening region inscribes or nearly inscribes the image surface of the film original is used and the reading optical magnification of the zoom lens unit 62 is adjusted and set such that the projected image inscribes or nearly inscribes the effective pixel region of the CCD. As a result, there is no difference between the image region of the finished print displayed on the monitor 18 and the image region of the print output from the image output device 16 and the print bearing image is reproduced from the film original bearing image as much as possible.

Next, when the film original bearing image is trimmed by the optical zooming using the zoom lens unit 62, since the image projected from the trimmed original image can be set to such a size that it inscribes or nearly inscribes the effective pixel region of the image sensor 30, the trimming can be executed entirely likewise the method described above. Therefore, the relationship between the trimming range and the main (fine) scanned image is entirely the same as the aforesaid relationship because a zoomed image is displayed on the monitor 18 as a prescanned image of 345 pixels×230 pixels.

Further, when the trimming is executed by electronic zooming in which the operator indicates a trimming range by the reference line from the film original image displayed on the monitor 18, the long side HD and the short side VD of the pixel region (the number of pixels) in the indicated trimming range are determined and the number of pixels on the frame memory 91b is calculated and set as the input pixel region (the number of pixels).

input pixel region long side;

$HI0 = HD \times MX + Ha$ short side;

$VI0 = VD \times MX + Va$

MX represents the ratio between a reading (CCD) pixel density and a display pixel density, Ha, Va represent the fine adjustment values of the amounts of allowance to the vignetting of the long side and short side and are set in consideration of the vignetting due to the image processing unit 74 and the image output device 16. The method of calculation executed thereafter is the same as that executed when no trimming is effected.

Therefore, the reference line displayed on the monitor 18 correctly shows the trimming region as the finished print image region. Since the reference line showing the trimming region is of course displayed in consideration of the pixel deficit caused by the processing executed thereafter, a conceivable error factor is only an amount of displacement of the light beam scanning unit of the image output device 16 from a design value. Since the amount of displacement is compensated in a reference scanning length, it is needless to say that there is no dislocation between the trimming region and the image region of the print output from the image output device 16. Therefore, the trimming job can be simply executed with a pinpoint accuracy by the method of the present invention.

The CPU 76 automatically sets the size of a film original to be read and a mask size by reading a standard optical magnification corresponding to a carrier ID code stored in the memory 78 using a previously obtained carrier ID code. When the size of a film original to be read is the same, although it is preferable that the standard optical magnification of the image input device 12 is set to the same value regardless of a set print size, the arrangement is not limited thereto.

When the reading optical magnification is read out as described above, the CPU 76 sets the reading optical magnification by adjusting the zoom lens unit 62. At the time, the size of the image of the film original projected to the image sensor 30 is set to such condition that it inscribes or nearly inscribes the effective pixel region of the image sensor 30. Further, the cut-out pixel region of the image sensor 30 is selected to satisfy the above condition as well as the size of the projected image is selected to ensure the image of the cut-out pixel region. It is preferable to use the image sensor 30 the aspect ratio of the size of the effective pixel region of which is the same as or near to the aspect ratio of the size of the image surface of the film original or the mask size. Further, as described above, when a light-sensitive material is subjected to digital exposure with a laser beam, the aspect ratio of the print size is considered and an image sensor cut-out condition is selected to the image sensor cut-out pixel region so as to achieve an inscribing or nearly inscribing condition to thereby obtain the recording image region of the film original as large as possible as well as ensure fine image quality by using the effective pixels of the image sensor 30 as much as possible.

Although the digital print method and apparatus of the present invention have been described above in detail, the present invention is by no means limited to the above embodiments and it goes without saying that various improvements and modifications can be made in the range which does not depart from the gist of the present invention.

As described above in detail, according to the present invention, when no trimming is executed, the optical magnification is fixed and the electronic magnification is changed each time a print size changes in a film original having the same film size even if recorded images have a different size. Further, the fixed optical magnification is the standard or set optical magnification which permits the image of the film original to be projected to the effective image region of the image sensor in the state that it inscribes or nearly inscribes the effective pixel region in a greatest possible degree. As a result, a print on which a reproduced image of high quality is printed can be obtained without the deterioration of image quality in high productivity without the need of effecting the troublesome optical magnification by operating the zoom lens.

Further, according to the present invention, when trimming is executed, since preference is given to the optical magnification over the electronic magnification so long as the optical magnification is possible and the electronic magnification can be executed at the time the optical magnification becomes impossible, even if only a part of the image recorded on a film original is enlarged, the deterioration of image quality can be prevented or minimized. In addition, since a trimming region can be adjusted while confirming it through the monitor, a trimming job can be easily executed as well as a trimming accuracy can be increased. Even if trimming is executed to minimize the vignetting of all the images recorded on the film original, trimmed images of high quality can be easily obtained with a pinpoint accuracy by the confirmation of the trimming through the monitor likewise.

What is claimed is:

1. A method of projecting images in a digital photoprinter, comprising the steps of:

displaying, on a monitor, both a reference line and an image from an original film which is received from an effective pixel region of an image sensor by adjusting at least one of an optical magnification and an electronic magnification, wherein the optical magnification projects a desired size of the original film image into the effective pixel region of the image sensor, wherein the electronic magnification is determined from an output pixel region based on a desired print size for reproduction of the original film image, and an input pixel region determined from the effective pixel region of the image sensor, and wherein the reference line indicates a cut-out pixel region based on both the output pixel region and the electronic magnification in consideration of an image deficit caused by image processing, the cut-out region created from the effective pixel region and signifying a finishing region of a print having the desired print size;

setting, when no trimming is executed, a desired print magnification by pre-setting the optical magnification in accordance with the film size of the original film, while adjusting the electronic magnification in accordance with the size of the original film image; and setting, when trimming is executed, the desired print magnification by giving preference to either the optical magnification or electronic magnification, wherein preference is given to the optical magnification when the desired image size for printing is to be matched on the monitor with a trimming region within the reference line, wherein preference is given to the electronic magnification when the trimming region is matched with the desired image size for printing on the monitor, and wherein the preferred optical or electronic magnification is adjusted by visually observing both the desired image and the trimming region within the reference line displayed on the monitor, the display signifying a finishing region of a print having the desired print size.

2. A method according to claim 1, wherein the print magnification is changed by adjusting a reading pixel density of the original film image in accordance with an area or a length of the reproduced image of the print, or according to the electronic magnification set at the time of the trimming.

3. A method according to claim 1 or claim 2, wherein when the trimming is executed, the print magnification is adjusted by giving preference to the optical magnification in a low print magnification in which the optical magnification can be changed by operation of a zoom lens, whereas the print magnification is adjusted by fixing the optical magnification and changing the electronic magnification in ranges where the optical magnification cannot be improved by operation of the zoom lens.

4. A method according to claim 1 or claim 2, wherein when the trimming is executed, the print magnification is adjusted by either the optical magnification or the electronic magnification, depending upon whether the electronic magnification has been set.

5. A method of projecting images in a digital photoprinter, comprising:

displaying, on a monitor, both a reference line and an image from an original film which is received from an effective pixel region of an image sensor by adjusting at least one of an optical magnification and an electronic magnification;

setting, when no trimming is required, a desired print magnification by pre-setting the optical magnification in accordance with the film size of the original film, while adjusting the electronic magnification in accordance with the size of the original film image; and setting, when trimming is required, a desired print magnification by giving preference to the optical magnification when a desired image size for printing is to be matched on the monitor with trimming region within the reference line, and by giving preference to the electronic magnification when the trimming region is to be matched on the monitor with the desired image size for printing, wherein the respective preferred optical or electronic magnification is adjusted by visually observing both the desired image and the trimming region within the reference line on the monitor, with the display signifying a finishing region of a print having the desired print size.

6. The method according to claim 5, wherein the print magnification is changed by adjusting a reading pixel density of the original film image in accordance with an area or length of a reproduced image of the print, or in accordance with the electronic magnification set at the time of the trimming.

7. The method according to claims 5 or 6, wherein when trimming is executed, the print magnification is adjusted by giving preference to the optical magnification in a low print magnification in which the optical magnification is adjusted by operation of a zoom lens.

8. The method according to claim 7, wherein, in ranges where the optical magnification cannot be improved by operation of the zoom lens, the print magnification is changed by fixing the optical magnification and adjusting the electronic magnification.

9. The method according to claims 5 or 6, wherein when trimming is executed, whether the print magnification is adjusted by optical or electronic magnification depends upon whether the electronic magnification has been set at the time of trimming.

10. The method according to claims 1 or 5, wherein the original film image is at least one of a plurality of original film images having a plurality of film sizes.

11. The method according to claim 5, wherein the optical magnification projects a desired size of the original film image into the effective pixel region of the image sensor.

12. The method according to claim 5, wherein the electronic magnification is determined from an output pixel region based on a desired print size for reproduction of the original print image, and from an input pixel region determined from the effective pixel region of the image sensor, in consideration of an image deficit caused by digital image processing.

13. The method according to claim 5, wherein the reference line indicates a cut-out pixel region based on both an output pixel region and the electronic magnification in consideration the image deficit, the cut-out region created from the effective pixel region and signifying a finishing region of a print having the desired print size.

14. The method according to claim 10, further comprising the steps of:

photoelectrically reading said plurality of images with the image sensor;

subjecting the read images to digital image processing, thereby converting the plurality of images into digital image signals;

exposing a light-sensitive material based on the digital image signals; and subjecting the light-sensitive material to development processing so as to obtain reproduced images having a plurality of print sizes.

* * * * *